(12) United States Patent
Fram

(10) Patent No.: US 11,400,663 B2
(45) Date of Patent: Aug. 2, 2022

(54) LIQUID MATRIX SHEAR PRESSURE IMPREGNATOR APPLICATIONS

(71) Applicant: Jerry R. Fram, Los Angeles, CA (US)

(72) Inventor: Jerry R. Fram, Los Angeles, CA (US)

( * ) Notice: Subject to any disclaimer, the term of this patent is extended or adjusted under 35 U.S.C. 154(b) by 301 days.

(21) Appl. No.: 16/392,313

(22) Filed: Apr. 23, 2019

(65) Prior Publication Data

US 2019/0322060 A1    Oct. 24, 2019

Related U.S. Application Data

(60) Provisional application No. 62/661,490, filed on Apr. 23, 2018.

(51) Int. Cl.
| | |
|---|---|
| *B32B 5/26* | (2006.01) |
| *B29C 70/50* | (2006.01) |
| *B29C 48/08* | (2019.01) |
| *B29C 70/48* | (2006.01) |

(52) U.S. Cl.
CPC ............ *B29C 70/504* (2013.01); *B29C 48/08* (2019.02); *B32B 5/26* (2013.01); *B29C 70/48* (2013.01); *B32B 2260/046* (2013.01)

(58) Field of Classification Search
USPC ............... 264/136, 257, 309, 299, 492, 510
See application file for complete search history.

(56) References Cited

U.S. PATENT DOCUMENTS

| | | |
|---|---|---|
| 2,596,162 A | 5/1952 | Muskat |
| 3,738,895 A | 6/1973 | Paymall |
| 3,932,980 A | 1/1976 | Mizutani et al. |
| 4,366,017 A | 12/1982 | Siri |
| 4,889,429 A | 12/1989 | Heinzmann et al. |
| 5,205,898 A | 4/1993 | Wilson et al. |
| 5,620,769 A | 4/1997 | Wessels et al. |
| 6,540,863 B2 | 4/2003 | Kenney et al. |
| 6,663,733 B2 | 12/2003 | Nagaya et al. |
| 6,854,499 B2 | 2/2005 | Miller |
| 7,238,251 B1 | 7/2007 | Driver et al. |
| 8,273,286 B2 * | 9/2012 | Fram .................... B29B 15/122 264/510 |

(Continued)

FOREIGN PATENT DOCUMENTS

| | | |
|---|---|---|
| WO | WO2011/161074 | 12/2011 |
| WO | WO2017/208206 | 12/2017 |

OTHER PUBLICATIONS

PCT/US2019028762 Extended European Search Report, dated Jan. 4, 2022.

*Primary Examiner* — Jacob T Minskey
(74) *Attorney, Agent, or Firm* — Canady & Lortz LLP; Bradley K. Lortz

(57) ABSTRACT

Systems and methods are described where a volume receiving a liquid matrix and fibers at an inlet where opposing sides of the volume converge to form a gap and a moving surface in contact with the liquid matrix and the fibers and moving with respect to the liquid matrix and the fibers through the gap such that shear force is transferred to the liquid matrix and the fibers pushing the liquid matrix and the fibers forward through the gap, creating currents in the liquid matrix and increasing pressure. The increased pressure within the volume forms a barrier to entrained gases within the liquid matrix such that the entrained gases are inhibited from passing through the gap along with the liquid matrix and the fibers.

18 Claims, 26 Drawing Sheets

(56) References Cited

U.S. PATENT DOCUMENTS

| | | |
|---|---|---|
| 8,915,211 B2 | 12/2014 | Salazar et al. |
| 2001/0001513 A1* | 5/2001 | Ishino .................. B29B 15/125 |
| | | 264/136 |
| 2002/0089098 A1 | 7/2002 | Nagaya et al. |
| 2003/0102069 A1 | 6/2003 | Miller |
| 2005/0126690 A1 | 6/2005 | Miller |
| 2006/0130753 A1 | 6/2006 | Driver et al. |
| 2007/0204952 A1 | 9/2007 | Driver et al. |

* cited by examiner

LIQUID MATRIX SHEAR PRESSURE IMPREGNATOR APPLICATIONS

BACKGROUND OF THE INVENTION

1. Field of the Invention

Embodiments of the invention relate to the continuous manufacture of fiber-reinforced composite materials, particularly in a sheet form. Embodiments of this invention relate to the use of shear forces from moving surfaces in contact with the liquid together with a confinement means to create regions of elevated pressure through which the materials pass. The elevated pressures inhibit entrained air and/or other gases from following the liquid and fibers through impregnation, thus excluding them from the product and improving wetout. Furthermore, currents generated by these shear forces can make the distribution of suspended fibers and fillers in the final product more uniform.

In cases where the liquid can sustain high shear forces, the surfaces in contact with the liquid can move very rapidly to powerfully wet out the fibers under high pressure and strong currents. However, the same concepts can be used to gently impregnate fibers under lower pressure in liquids or solids that cannot sustain high shear forces. This method does not use direct mechanical contact with the composite during production, which could degrade the fibers.

2. Description of the Related Art

In composite production, fiber reinforcement and a liquid matrix are combined to make a uniform material. Voids, such as air bubbles should be minimized or eliminated, as should other non-uniformities, such as might occur in the distribution of solids suspended in the matrix, if present, or in the fiber distribution itself, where the fiber reinforcement is discontinuous. While composites are sometimes made with direct agitation as with a mechanical mixer, such methods are not generally used, because they damage and weaken the fiber reinforcement, and they are not possible with continuous fiber reinforcement. Instead, generally composites are made in sheet form which enables gentler means of impregnation and allows for continuous reinforcement.

Air is often either initially entrained in the matrix or carried in by the fibers. While air exclusion is simpler when the matrix is of low viscosity and fiber content is low, it becomes more difficult with more viscous matrices and higher fiber content. Solids suspended in the matrix usually make it more viscous, making air elimination more difficult. Also, the fibers can block suspended solids from penetrating completely, making the distribution of solids non-uniform. However, more viscous matrices, higher fiber content, and suspended solids can often be desirable in terms of properties and economics.

There are a number of techniques to form and wet out FRP materials in sheet form, and some more important ones are itemized below. While these techniques are of great value, they are all limited in the viscosity of the matrix or the proportion of fibers and other solids that can be added with good impregnation.

A first technique for composite impregnation is to dip the fibers in a bath and squeeze out the excess resin through a restriction such as a bushing, die, or calendering rolls. One example of this technique is pultrusion, where fibers are dipped into a resin and then pulled through a heated die to form a constant-cross-section part. In addition, filament winding, prepreg treaters, and many other processes can also utilize this first technique. This method is also used to impregnate fiberglass cloth with PTFE, where the matrix is of very low viscosity, but cannot sustain much shear force without degradation.

A second technique for composite impregnation is to meter a thin layer of matrix onto a plastic film, and then either push the fibers into it or allow them to settle in over time. This second technique is used in fiber reinforced plastic (FRP) panel manufacture where a liquid, typically a polyester resin, is metered onto a carrier film in a thin layer, and then reinforcement is either dropped onto the resin, in the case of chopped fibers, or pushed into it, in the case of mat or continuous fiber reinforcement. The film with resin and fibers is pulled over a heated bed, where the fibers and/or mat settle into the resin layer and are wet out by it. Sometimes, fibers are gently pushed into the resin on this heated bed as an additional wetout measure. At the end of the heated bed, a top film is then pressed onto it with a nip roll.

A third technique for composite impregnation is to use precisely ground heated rolls to convey the FRP, usually on release paper, through one or more nip points formed by these rollers pressing the material against additional heated rolls. This technique is used to make prepreg from continuous fibers. In this case, normally, the product is much thinner than in the second technique, the proportion of fiber is much higher, and the force of the nip roll(s) are also much higher. This technique is used for manufacturing prepregs with continuous fibers and hot-melt resin. In this process, the release paper is coated with hot-melt resin, and a thin row of continuous fibers is brought in with an opposing release paper and pressed into the resin-coated paper at the nip points.

A fourth technique for composite impregnation involves working the resin material between two plastic sheets under low pressure with grooved rollers or with a dual-wire-mesh compaction device. A dual-wire-mesh-belt compaction device conveys the resin material in a serpentine path between two wire-mesh belts under and over a number of processing rollers to wet out the material. This technique is used to make sheet molding compound (SMC).

A fifth technique for composite impregnation is used in either TMC Manufacture or Heinzmann technology. Examples of these processes are described in U.S. Pat. No. 3,932,980 to Mizutani and U.S. Pat. No. 4,889,429 to Heinzmann, and are used to make materials very much like SMC. These methods use rotating cylinders and side dams to bring the resin matrix and the charge together and impregnate them in a gap between the rotating cylinders. After impregnation, the FRP is stripped from the rotating cylinders and packaged. The methods used to strip the FRP from the rotating cylinders and package it are what distinguishes these two techniques from each other.

More recently, U.S. Pat. No. 8,273,286, by Fram, discloses systems and methods where at least one roller (e.g., a kicker roller) is used to impregnate fibers (i.e., a charge or reinforcement) with a liquid resin (i.e., matrix) by eliminating air from the resin and fibers as they are pushed into a pressurized zone. The resin and fibers are first dispensed into an entry zone, then they are drawn to an "entry gap" adjacent to the roller carrying film, in most cases, and thrust into a pressurized zone on the opposite side of the "entry gap". The resin and fiber composite combination then passes out of the pressurized zone usually with film through a small "exit gap" to atmospheric pressure, pushed out under pressure. Shear forces between the surface of the quickly rotating driven roller and the resin provide the pressurizing and driving force.

U.S. Pat. No. 8,915,211, by Salazar et al., discloses a two roller impregnator for impregnating a fiber with (catalyzed) resin. The resin is kept directly above the two rollers and enclosed with a set of dams to create a resin pool. A different resin pool may be generated for each roller. The resin release mechanism facilitates for the resin and, if necessary, a catalyst, to be released into the resin pool(s). Temperature of the resin pool can be controlled, along with the temperature of each roller. A post-impregnation catalyst activator can be utilized to activate the catalyst.

International Patent Application Publication No. WO2011/161074, by Bruessel, discloses a mixing apparatus for continuously producing a fibre-matrix mixture has two mixing units arranged so as to lie opposite one another on a base frame. Each of the mixing units has at least two rotatable deflecting rollers around which belts are guided. The belts delimit a mixing clearance for the fiber-matrix mixture. At least one supporting element for supporting the respective belt along the mixing clearance is arranged between the deflecting rollers. A sufficiently high pressure for blending and impregnating the constituents of the fibre-matrix mixture is thereby generated in the mixing clearance. To strip off the fiber-matrix mixture from the belts, provision is made of a discharge unit, which has two discharge elements that are associated with the belts and have associated stripping-off edges. The mixing apparatus can produce a mixture strand which can be further processed directly as an SMC semifinished product.

There is a need in the art for apparatuses and methods to expand the range of composites that can be made continuously. Such apparatuses and methods should combine the fiber and matrix in a more powerful way to exclude air and to make the product uniform. At the same time they may not mechanically degrade the fiber reinforcement. There is further a need for such systems and apparatuses to be cheaper and operate at higher production rates than existing systems. Meeting these needs could lead to production of materials that are superior to those currently produced, with advantages such as lighter weight, greater strength, lower cost, etc.

SUMMARY OF THE INVENTION

The key elements of embodiments of the invention focus on how shear forces in FRP manufacture create currents and pressure gradients that make the product more uniform and separate out entrained air. Although not generally discussed, these shear forces and their resulting currents and pressure gradients are always present in existing processes for production of composite materials; the understanding of their function presented here is novel and an important aspect of the technology. However, in some cases such shear forces degrade the matrix. Accordingly, it is important to configure the impregnation to optimize use of shear forces.

As part of this novel understanding, the term "pressure barrier"—the barrier that prevents air from following the FRP through the impregnation process—is employed in the present description. In addition, the term "impregnation pressure," which is the pressure the FRP attains, normally with respect to atmospheric pressure, passing through a "pressure barrier" is also employed. The "impregnation pressure" is directly measurable. A "pressure zone" is a volume of FRP in the production line at "impregnation pressure." To maintain pressure (and also to prevent dissipation of currents in the FRP), the "pressure zone" has to be mostly enclosed. Generally, the FRP enters a "pressure zone" through an "entry gap" and leaves it through an "exit gap." Actually, the force on an entrained air bubble due to pressure changes at any point is roughly proportional to the pressure gradient in the FRP and in the opposite direction at that point, that is, qualitatively, the change of pressure at that point divided by the distance of that pressure change.

In this description, the term "line speed" is used as a point of reference, meaning the linear speed at which the composite is produced. In the case of composites with continuous fiber reinforcement that does not stretch, "line speed" is simply the speed of the fiber reinforcement in the production of the composite, and it is independent of position in the line. In other cases, where the product is elastic in production, "line speed" will increase with the stretch, so it varies with position in the line. The term "rapidly moving" here means moving much faster than "line speed."

In most embodiments presented in this patent, there are "rapidly moving" surfaces in contact with the matrix or FRP. These are the surfaces of driven cylindrical rollers, which we call "shear-pump rollers," because they pump the FRP, that is pressurize it and move it, creating currents in it with speeds in the range of the "rapidly moving" surfaces, by exerting shear forces on it. However, good wetout can also be achieved completely by configuring the equipment with stationary surfaces with the film sliding over one surface. In this case, the film (moving at line speed, not moving rapidly) is the only moving surface in contact with the materials. So, while there is the potential for development of new materials using high shear forces, it is clear that lower speeds and shear forces can also be useful.

Systems and methods are described where "shear-pump rollers" are used in the impregnation of fiber reinforced composites. In some cases, chopped fibers may be suspended in the matrix and travel with it. In other cases, mat or continuous fiber reinforcement are pulled through impregnation process with the matrix and exit together with it.

A typical apparatus embodiment of the invention can be used to make FRP either with continuous or discontinuous fiber reinforcement. It is comprised of an impregnator apparatus, including a pair of rollers disposed parallel to one another with dams on each side and a gap between them, the "entry gap," wherein at least one of the pair of rollers, called the "entry roller," comprises a "shear-pump roller." The other roller of the pair, called the "entry-exit" roller, can either be an un-driven idler roll carrying film through at line speed, or another "shear-pump roller", not in contact with film. On the other side of the "entry gap," there is a mostly-enclosed volume, the "pressure zone," bounded by the "entry roll," the "entry-exit roll," side dams, a scraper working against the "entry roller," and a "carrier roller" parallel to the original pair of rollers. The "exit gap" is the gap between the "carrier roller" and the "entry-exit roller." In this embodiment, the equipment is designed so that it can be quickly opened up and disassembled for cleanup.

In the above embodiment, at least one film is required to prevent the FRP from sticking to itself when wound into rolls. With discontinuous fiber reinforcement, film is also required just to carry the FRP, since it cannot support itself. Film can be passed through the "pressure zone" on one side of the FRP by the "carrier roll" or, if the "entry-exit roll" is an idler, then it can take the film through the "pressure zone" on the other side of the FRP. When the "carrier roll" takes the film through the "pressure zone", the film enters the "pressure zone" through the "film gap," a narrow gap between the "carrier roller" and the scraper mount. Scrapers are required for the "entry roll" or the "carrier roll", when either one does not take a film, to keep the FRP together and to keep the FRP from sticking to the roll and following it around. When these rolls take film, or if they are stationary, they do not require scrapers.

In the above embodiment when the "entry-exit roll" is an idler roll used to take film through the "pressure zone," it must be wider than the film, and the side dams must have a small clearance with the surface of the "entry-exit roller" allowing the film to be fed through the "pressure zone" and out the "exit gap" unimpeded.

In the above embodiment when both the "entry roll" and the "entry-exit roll" are "shear-pump rollers," the only film present in the "pressure zone" is the one taken through around the "carrier roll." However, a second film can be pressed into the product after the "exit gap" for packaging.

In the above embodiment, when only low impregnation pressure is required, the impregnator can be opened up, as was originally intended only for cleanup, eliminating the entry gap. This was done in the first implementation and the entry and entry-exit rollers were kept stationary. With these rolls stationary, no scrapers were required on any roll, and the scraper on the entry-exit roll was removed. The "scraper" on the entry roll was kept in place even though it didn't actually scrape just to contain the matrix.

Another apparatus embodiment of the invention comprises a dip tank apparatus, including either a pair of parallel driven "shear-pump rollers" with a gap between them or a single "shear-pump roller" with a gap between its surface and a parallel baffle. These are immersed in a tank of resin matrix with side dams immersed therein as well. Fiber reinforcement is passed between the side dams through the gap. In this embodiment, the fiber reinforcement must be continuous. With the side dams and scrapers immersed in the matrix, though they must form an effective barrier to passage of the matrix, it is not necessary for them to seal perfectly, since any matrix, that may leak, harmlessly returns to the tank. Also, for the same reason, the distance between the side dams can be greater than the product width, unlike the first embodiment. An idler roll is required in the bottom of the tank to turn the FRP around.

In one set of instances, a "pressure zone" is formed, below the "entry gap," with scraper(s) against the "shear-pump roller(s)." In the case of two "shear-pump rollers" the "exit gap" is between the two scrapers. In the case of a single "shear-pump roller," the "exit gap" is between the scraper and the baffle.

In another set of instances, the scrapers and "exit gap" are eliminated, eliminating the "pressure zone" below the "entry gap," thus reducing the "pressure barrier" for a given "shear-pump roller" rotational speed. While there is no enclosed "pressure zone" in this instance, there is elevated pressure in the "entry gap" between the two "shear-pump rollers" because more matrix is pushed toward this gap than can go through it. So, there is still a "pressure barrier." This second instance is simpler than the first, so it could be more reliable in some situations, and the pressure barrier is adjustable over a wide range by adjusting the speed of the roller(s) and the gap between them In another still simpler instance, possibly suitable for matrices that can only take a very limited amount of shear force, two non-driven rollers are rotated by contact with the web. The gap between these rollers is adjustable making for adjustment of the pressure barrier with pressure varying inversely with the gap between the rollers.

One exemplary embodiment comprises a composite processing apparatus including a volume receiving a liquid matrix and fibers at an inlet where opposing sides of the volume converge to form a gap for the liquid matrix and the fibers to pass and at least one cylindrical surface forms one of the opposing sides of the volume and the gap and a moving surface in contact with the liquid matrix and the fibers and moving with respect to the liquid matrix and the fibers through the gap such that shear force is transferred to the liquid matrix and the fibers pushing the liquid matrix and the fibers forward through the gap, creating currents in the liquid matrix and increasing pressure in the liquid matrix within the volume in a forward direction toward the gap. The increased pressure within the volume forms a barrier to entrained gases within the liquid matrix such that the entrained gases are inhibited from passing through the gap along with the liquid matrix and the fibers. In some embodiments, the liquid matrix comprises a viscous liquid matrix, where the viscous liquid matrix is at least an order of magnitude more viscous than water. The fibers can comprise chopped fibers or a continuous web such as a chopped strand mat, a woven roving, or continuous parallel fibers.

In further embodiments, the volume can be formed between the at least one cylindrical surface and a second cylindrical surface. The second cylindrical surface can be on a stationary roller and the moving surface can comprise a film moving along the at least one cylindrical surface through the gap. The fibers can comprise a mat entering the inlet with the liquid matrix and passing through the gap with the liquid matrix and the film.

In some embodiments, the moving surface can be a surface of a driven roller. The surface of the driven roller can also be the at least one cylindrical surface. The driven roller can be one of a pair of rollers disposed parallel to one another forming the gap therebetween. A second volume for the liquid matrix after the gap can be enclosed by the pair of rollers, a scraper, side dams and a carrier roller and an outlet for the liquid matrix from the second volume is formed between one of the pair of rollers and the carrier roller. A film can be included to enter the gap on one of the pair of rollers and passes through the outlet around the carrier roller. In some cases, the pair of rollers can both be driven. A second film can enter the second volume through a film gap between the carrier roll and the scraper and sandwich the liquid matrix and fibers with the film at the outlet.

Embodiments can further include dams on each side of the volume keeping the liquid matrix moving from the inlet through the gap without escaping from each side. Each of the dams on each side of the volume can bound an end of a roller and a cylindrical surface of a second roller. Each of the dams can have a film gap between itself and the cylindrical surface of a second roller to allow film to pass by each dam but stop the liquid matrix.

In some embodiments, the apparatus can be disposed in a tank filled with the liquid matrix. The moving surface can comprise a surface of a driven roller and the at least one cylindrical surface is the surface of the driven roller immersed in the liquid matrix in the tank and disposed adjacent a second surface forming the gap therebetween and dams on each side of driven roller and the second surface bound the liquid matrix between the rollers into the gap and the fibers are continuous passed through the gap with the liquid matrix. In some cases, the second surface can comprise a second driven roller. Alternately, the fibers can be continuous and pulled external to the tank to contact and thereby drive a pair of idler rollers such that the moving surface comprises at least one surface of the pair of idler rollers and the at least one cylindrical surface is the at least one surface of the pair of idler rollers, the pair of idler rollers being immersed in the liquid matrix in the tank and disposed parallel to one another forming the gap therebetween and having dams on each side of the pair of idler rollers to bound the liquid matrix between the idler rollers into the gap, and the gap is changed by adjusting a position of at least one of the pair of idler rollers relative to the other.

DETAILED DESCRIPTION OF THE PREFERRED EMBODIMENT

1. Overview

Figure 1A:
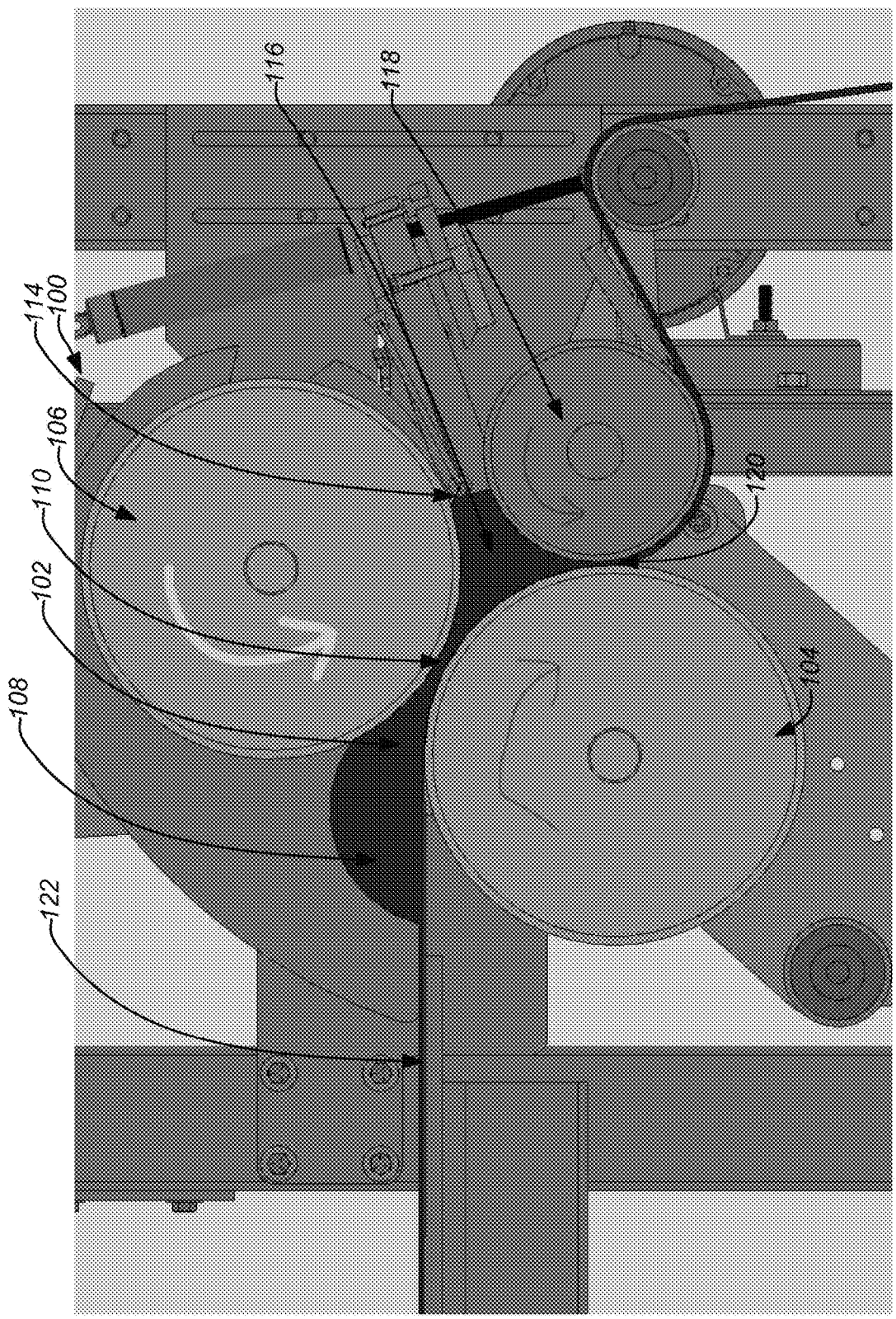
FIG. 1A and shows an impregnator embodiment of the invention employing a single "shear-pump roller" and a single film.

U.S. Pat. No. 8,273,286, by Fram, incorporated by reference herein, discloses systems and methods where at least one roller (e.g., a kicker roller) is used to impregnate fibers (i.e., a charge or reinforcement) with a liquid resin (i.e., matrix) by eliminating air from the resin and fibers as they enter a pressurized zone. Air is forced out as the resin is first drawn into an entry zone of the roller, then into an "entry gap" adjacent to the roller, and then into the "pressure zone" on the opposite side of the roller. The "pressure zone" is an enclosed area at the output side of the roller. The resin and fiber combination is then forced out through a small "exit gap." Shear forces between the surface of the quickly rotating driven roller and the resin provide the driving force pressurizing the matrix. The fibers may be continuous (e.g., mat from a roll) or discontinuous, for example, loose cut.

However, the systems and methods of the prior art do not provide improvements which allow for better containment and sealing of the entry zone and the "pressure zone," which augment the "impregnation pressure" and concentrate the currents in the FRP. In addition, the pressure impregnator of Fram, above, describes only one embodiment employing two kicker rollers (driven rollers), neither of which support a film. There are no means to bring film into the "pressure zone" directly.

Systems and methods are described where at least one moving surface in combination with side dams and other means of confinement, such as baffles, scrapers, and other roller(s) impregnates fibers (i.e., a charge or reinforcement) with a liquid resinous matrix by exerting shear force on the matrix to generate currents in it and pressurize it by forcing it, with the fibers into a converging volume having a gap against a circular surface (e.g. a driven, idle, or stationary roller. Air is eliminated from the resulting composite, repelled by the resulting "pressure barrier," and the currents serve to stir up the resulting composite making it more uniform with more intimate contact between the matrix and the fiber reinforcement. The fibers may be continuous (e.g., from a roller) or discontinuous or loose cut.

Embodiments of the present invention use shear forces to generate pressure gradients and currents in the matrix to make the composite more uniform and to exclude air where the composite is formed. These shear forces are generated by one or more rotating rollers in contact with the matrix driven with surface speeds which can be well above "line speed." The resulting pressure is roughly proportional to the speed of the rollers times the viscosity of the matrix. The speed of the currents at the roller(s) is the surface speed(s) of the roller(s). The pressure gradients derived from shear forces can be much greater than those due to gravity, or those occuring in most impregnation systems currently in use, so entrained air can be much more effectively excluded from the uncured resin. Similarly, the currents in the forming composite can be far faster than those encountered in most impregnation systems currently in use. The forces on the air are different from the forces on the matrix, first, because air bubbles have very low viscosity. so the forces are strictly normal to the bubble surface, which is to say they are not shear forces, and second, because of low mass, so air is not affected by inertia or gravity like the matrix is. That principal is used to push entrained air out of the FRP. It should be noted that most of the processes in current use to impregnate composites do not appreciably damage the fibers. In this process, also, the fiberscan be treated gently and not degraded.

Some embodiments of the invention can employ "entry rolls" and "entry-exit rolls" having a common width which then enables the use of a side dam on their outside edges instead of on their surfaces. With this configuration, the "entry gap" can be adjusted over a continuous range with a given pair of side dams. Also, O ring seals can be easily added to the sides of the rollers to further to prevent leaks and thus improve "impregnation pressure" and contain currents in the matrix. In addition, previously, a small "entry gap" would require a delicate side dam there, which could easily deform and tear the film, but with the side dams on the outside edges of the rollers, there is no part of it that is thin and delicate. Embodiments of the invention employing two "shear-pump rollers", which can be used to achieve the same impregnation pressure with a reduced concentration of shear forces, or a greater impregnation pressure with the same concentration of shear forces. So gentler handling of the material or greater impregnation can be achieved or a combination of those two attributes. Some embodiments can also introduce a second film at the exit from the pressurized zone.

Those skilled in the art will appreciate that various embodiments of the invention can be made in many different configurations employing "shear-pump rollers" applied to a resin matrix and charge pushed into a "pressure zone". Some example configurations for embodiments of the invention are defined in the next section.

It should be noted that the primary focus of embodiments of the invention is in the manufacture of fiber-reinforced polymer (FRP) materials. Accordingly, the language herein applies to that application. However, it should be understood that the principles used also apply generally to the manufacture of other composite materials. Also, excluded "air" as used herein could be another gas or non-viscous fluid.

2. Impregnation and Air Exclusion Principles

Embodiments of the present invention can be used to impregnate fibers with a resin matrix in the continuous manufacture of fiber reinforced polymer (FRP) materials in a sheet form. During FRP manufacture, a liquid resin matrix is combined with fiber reinforcement, where it must impregnate (or "wet out") the fiber reinforcement in order to bond with it. The resin matrix with fiber reinforcement then becomes solid in the final product either by curing, for thermosetting matrices, or cooling, for thermoplastic matrices. In some cases, like SMC production, the material manufactured in the processes of this patent are an intermediate product, used for molding a final product. In these cases, a thickening agent is added to the resin so that over time, it reaches viscosities appropriate for molding, but no longer for impregnating the fiber reinforcement. The resin matrix bonds the fiber reinforcement together in the FRP or at least encases it and gives the material shape, hardness and other properties. The fiber reinforcement gives the product strength and rigidity.

Air should be excluded from the FRP during wetout to optimize its properties. Embodiments of the present invention provide a means of excluding air more powerfully from FRP than can be achieved using many existing processes, enabling higher fiber content and/or greater matrix viscosity. Conversely, the power of air exclusion can be throttled down in a controlled way to achieve the desired wetout with less shear forces. The vehicle for air exclusion in all FRP processes in the analysis presented here is pressure gradients generated by shear forces in the liquid resin matrix as it impregnates the fiber reinforcement. However, embodiments of the present invention employ shear forces between the viscous liquid resin matrix and "moving" surfaces that contact the matrix to generate, far larger pressure gradients than can be encountered in most other impregnation processes. Accordingly, embodiments of the present invention can yield much greater pressures to remove air from the liquid matrix during impregnation. Alternatively, where high shear forces cannot be sustained, these methods can be used to improve wetout with more gentle handling by managing the shear forces more efficiently.

A viscous liquid in contact with a moving surface will move with the surface and carry adjacent liquid with it. Consequently currents will be generated in the liquid in outside of the immediate area of the moving surface. When the flow of the liquid is restricted, as it is in the current methods by the "entry" and "exit gaps" and side dams, much of the liquid cannot pass through the gap and must turn back and recirculate. This is the source of the pressure increases and the currents throughout that make for more uniform and intimate contact between the matrix and the fiber reinforcement.

In this paragraph and the following two paragraphs, we examine qualitatively the forces on air in a liquid due to pressure changes, starting with the everyday example of a glass of water and the known principles of buoyancy. As described above, there are also currents in the liquid, and air bubbles will tend to follow these currents, but here we consider the forces on the bubble separately from this flow. The pressure in a liquid (in gravity) increases with the depth from the surface. The top surface of water (in a glass, bathtub, lake, etc.) is at atmospheric pressure, but the pressure at a given depth increases proportionally with the depth below the surface. The pressure is equal to the depth multiplied by both the density of the liquid and the acceleration of gravity. An incompressible object in the water (which itself can be considered incompressible here) is subject to a buoyant force from the pressure variation in the water. From Archimedes' principal, this buoyant force is known to equal the weight of the water displaced, and it is independent of depth. A simple calculation shows this buoyant force is in fact proportional to the gradient of the pressure in the water averaged over the surface of the object and in the opposite direction. The same calculation of buoyant force applies in the case of the water in motion, where the pressure might vary in a more complicated way than simply as a function of depth. In a glass of water, the pressure only varies with the depth. It is given by density of the water times the acceleration of gravity times the depth. So, the gradient of pressure, which is the spatial derivative of the pressure in its direction of maximum increase is a vector pointing down whose value is the density of the water multiplied by the acceleration of gravity.

The behavior of an air bubble in a liquid is more complicated than that of an incompressible object; because its size varies in the inverse sense with pressure, the pressure inside an air bubble at a given depth is constant, and the air bubble does not have a fixed shape. However a more detailed qualitative explanation of the forces on an air bubble in liquid here is not required. Pressure acts to buoy an air bubble in the same way that it acts on an incompressible object. Also, since in comparison to the resin matrix, air has negligible density and viscosity, it is not subject to significant gravitational, inertial, and shear forces as the resin matrix is.

In FRP manufacturing, the resin matrix is a viscous liquid in motion, and there are typically forces significantly larger than gravity acting on the matrix. Generally, in existing processes, there are one or more stages where the FRP, initially at atmospheric pressure, is pushed through a region of higher pressure and then returned back to atmospheric pressure at the last stage. As previously mentioned, air is removed from the resin matrix in these processes, because the pressure gradient in the transition from lower pressure to higher pressure pushes the air away from the higher pressure region(s) of the FRP. In all these processes, air, there are paths for air to escape as it is repelled from the higher pressure regions. Here we call the pressure of a higher pressure region the "impregnation pressure." Existing techniques can be analyzed using these terms and principles hereafter, although such consideration is original to the present application.

Referring back to the conventional first technique for composite impregnation, in the initial impregnation stage of these processes, the "impregnation pressure" is gravitational from just dipping the fiber into the resin bath. In the final restriction, the "impregnation pressure" can be elevated and there can be currents in the resin due to shear forces on the matrix exerted by the restriction. However, these shear forces and currents are generated only at the relative speed of the composite with the fixed restriction, which is around "line speed."

Referring back to the conventional second technique for composite impregnation used in FRP panel manufacture, in all these processes, the "impregnation pressure" in the bed is just very slightly more than atmospheric pressure, because the resin layer is very thin, and its viscosity is low. At the end of the heated bed, a top film is then pressed onto it with nip rolls, exerting a shear force on the FRP, which forms currents in the resin and an additional small, but larger "pressure barrier" to the air. Again the relative speed of the nip rolls with respect to the resin is of the order of "line speed" or smaller, so the pressure barrier and current speeds are also small.

Referring back to the conventional third technique for composite impregnation used in prepreg manufacture, effectively, here again there is a "pressure barrier" and resin current at each nip point. The pressure barrier directly excludes air at the first nip point, and air excluded from the following nip points must escape from the sides. The "pressure barrier(s)" and current are due to the shear forces of fiber and release paper going forward in contact with the resin, for if there were no shear forces, there would be nothing pushing the resin through the nip points. However, the release paper, fibers, and resin are all moving at around line speed, so their relative speeds would be less than line speed, and the resulting shear forces and current speeds are low.

Referring back to the conventional fourth technique for composite impregnation used in SMC manufacture, there are currents generated in the matrix "pressure barriers" that exclude air at each nip point of the compactor. These start at the entry point, where the air can be excluded directly, and include all the nip points between the upper and lower rollers, where the air could exit out the sides or find a longer path. The "impregnation pressure," though not directly measurable, can be controlled by controlling the force pushing the lower and upper rollers together, and the average can be calculated. This force is limited because if it is too great, either the SMC is prevented from entering the compaction device, or it is squeezed out the sides. The speed of the films pushing the SMC into the compactor is very close to "line speed," so there again, the relative speeds would be less than "line speed" with correspondingly low shear forces and current speeds.

Referring back to the conventional fifth technique in TMC Manufacture or Heinzmann technology for composite impregnation used in FRP panel manufacture, the "impregnation pressure" and currents are higher than others because the rolls in contact with the FRP turn fast. However, other deficiencies in processing can degrade the resulting material. These techniques must use discontinuous, chopped fiber reinforcement, and cannot use continuous mat or fibers. The FRP must be scraped or flung off the wetout rollers on the other side of the gap and then gathered and packaged. In the TMC process, the FRP is flung onto a plastic film, another film is placed on top and the product is rolled flat and cut into lengths. In Heinzmann technology, the FRP is scraped off, extruded, and cut to lengths. In both cases, after passing through the first "pressure barrier" at the gap between the rollers, the FRP goes immediately back to atmospheric pressure below the impregnation rollers, instead of going into a pressure zone as in the techniques presented here. This reduces the pressure in the gap, and therefore, reduces the "pressure barrier." In both cases the product after impregnation is discontinuous with air in between the pieces, and it must be compressed for packaging and air removal. This compression could degrade the material.

Referring back to U.S. Pat. No. 8,273,286, by Fram, the "pressure barrier" in the entry zone is increased, because there is back pressure at the "entry gap" from the "pressure zone." The fibers may be continuous or discontinuous or both.

Referring back to U.S. Pat. No. 8,915,211, by Salazar et al., here, the "impregnation pressure" is limited by the shear force applied by the rollers, and there is little additional force that could push the resin into higher pressure since the rollers move at "line speed." Regarding International Patent Application Publication No. WO2011/161074, by Bruessel, here also, the "impregnation pressure" and current speeds are limited by the shear force applied by the rollers at "line speed."

Shear forces exerted on a liquid are proportional to the speed(s) of surfaces in contact with it, and the liquid's viscosity. The speed of currents in the liquid in contact with these surfaces is around the speed of the surfaces. The surface speed(s) of FRP in most manufacturing processes is slow—typically the "line speed" of the process, that is, less than a normal walking speed with a relative speed between the FRP and the surfaces it contacts being well less than that. As a consequence, in most of these processes the "impregnation pressure" is only fractionally higher than atmospheric pressure in absolute terms, and the speed of the currents is similarly low. Thus, the ability to stir up the resin matrix and remove air from the it in these processes, overcoming high viscosity in the matrix or high fiber content, is limited.

Embodiments of the invention present techniques to wet out FRP materials with higher limits of matrix viscosity and fiber content than are encountered in current processes. The essential features for embodiments of the present invention include increasing the process surface speeds in contact with the FRP to a point which could be well beyond "line speed" during the process thereby generating shear forces and currents that can be very strong. The FRP is confined, at least with side dams and narrow gaps, so that these high shear forces generate elevated pressure and the currents are concentrated, not dissipated. The high surface speeds are derived from rollers, which can be turning very rapidly in contact with the FRP, positioned to push the resin matrix into confined spaces. The confinement can be achieved from the surfaces of these rollers in combination with dams on each side of the rollers, scrapers, and additional roller(s). Accordingly, the resulting absolute "impregnation pressure" and current speeds can be an order of magnitude higher than those of most FRP processes in current use.

It should be noted that discontinuous fibers behave differently than continuous fiber reinforcement under the described processes. In both cases, they are introduced into the matrix and wet out by it. However, continuous fiber reinforcement is pulled through the process, essentially at line speed and the matrix can be carried by it. In contrast, discontinuous fibers cannot carry the matrix. Thus, discontinuous fibers travel with the matrix, and typically a film is used with discontinuous fibers to carry both the resin matrix and the fibers.

3. Applications for Composite Impregnation

Systems and methods are described where driven rollers are used in the impregnation of fiber reinforced composites to pressurize a viscous liquid matrix and generate currents in it with shear forces on the liquid, pushing it through an impregnator at elevated pressure. In some cases, discontinuous, or chopped fibers are suspended in the matrix and travel with it. For such embodiments, the liquid matrix comprises a viscous liquid matrix, where the viscous liquid matrix is at least an order of magnitude more viscous than water. In these cases, film is introduced into the impregnator and used to convey the resulting composite out. In other cases, mat or continuous fibers are pulled through the impregnator, becoming impregnated by the matrix, and the matrix is pulled out by the continuous fibers as part of a composite that has just been formed. With continuous reinforcement, film, moving at the same speed as the fiber reinforcement, can be introduced into the impregnator, if required for packaging, but the process also can work without film. Also, often a single film can be used instead of two films with resulting economies.

A typical embodiment of the invention, with mat or continuous fiber reinforcement, comprises an impregnator apparatus, including an "entry-exit roll" and an "entry roll" disposed parallel to one another and having a gap there (the "entry gap"), wherein the "entry roll" is a fast-moving "shear-pump roll," and the "entry-exit roll" can either be another "shear-pump roll" or an idler roller moving with the material at about "line speed" with a scraper to keep the composite from sticking to it and following it around, side dams on each side of the material, a "carrier roller" parallel to the pair of rollers and disposed at the outlet area. The matrix and fiber reinforcement, if discontinuous, are moved through the rollers with currents much faster than line speed, but with a vector average speed at "line speed." A "pressure zone" is formed by surfaces of the "entry roll," the "entry-exit roll," the "carrier roll," the side dams, and a scraper. Film is introduced around the "carrier roller" into the "pressure zone" through a small gap between the "carrier roller" and the scraper mount, and the film carries the composite out the "exit gap" to a winder for packaging.

Figure 1B:
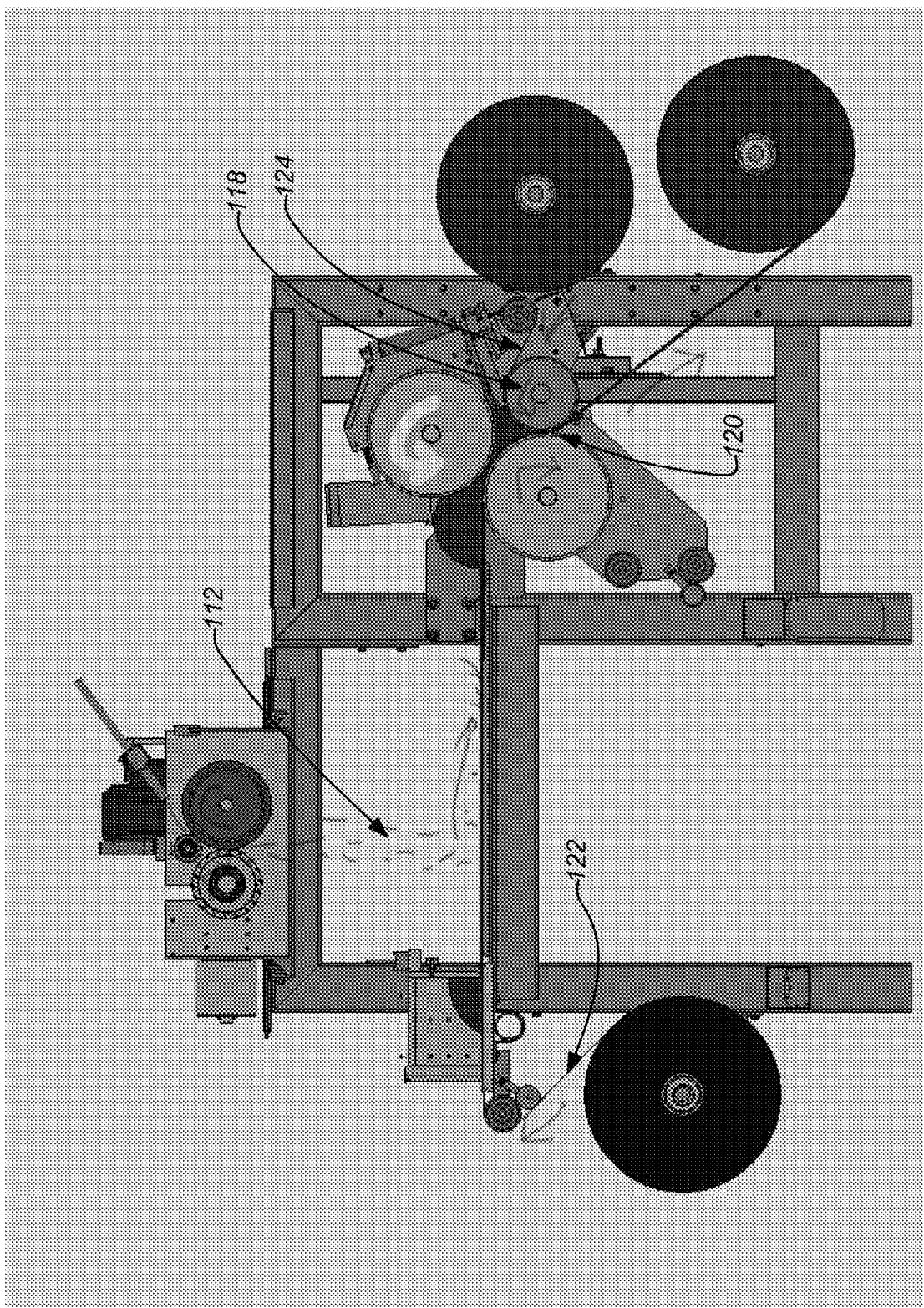
FIG. 1B shows a two-film, single "shear-pump roller" impregnator with a doctor blade to meter the matrix and a chopper to meter and chop fibers.

FIGS. 1A and 1B show an example impregnator embodiment of the invention. Both figures indicate the use of a film to feed the matrix and fibers to the impregnator. FIG. 1B indicates a second film fed into the high-pressure volume, but FIG. 1A indicates the same process without that film, but with a scraper on the "carrier roll" instead. The scraper in FIG. 1A prevents the FRP from sticking to the "carrier roller" and forces it to stay with the film instead. However, with the film shown in FIG. 1B, the scraper is not necessary. In FIG. 1B a doctor blade is shown metering a layer of matrix onto a film. After the doctor blade, a fiber cutter drops chopped fibers across the width of the matrix coating. These are followed by an impregnator with a single "shear-pump roller" with a second film (not present in FIG. 1A) introduced into the high-pressure volume (second volume) on the "carrier roller". A winder is shown for packaging. The "entry roller," a "shear-pump roller," is the driven roller above and to the right of the "entry-exit roller," an undriven roller in these figures, and the two rolls together form the inlet to the "pressure zone." In FIG. 1B, the carrier roller carries the film into the high pressure volume and the now impregnated FRP is carried through the "exit gap" between the two films to the winder. Notably, the increased pressure leading up to the "entry gap" and within the "pressure zone" forms a barrier to entrained gases within the resin such that the entrained gases are inhibited from entering the "entry gap" with the viscous matrix. This increases impregnation of the resin into the fibers and therefore improves properties of the resulting composite material.

In FIG. 1A a single film is introduced around the "entry-exit roller", which is an idler roller, and a scraper on the carrier roller keeps the FRP from following it around. The matrix and fibers are metered onto the film coming in from the left. The method for metering these components is not shown here, but could be a doctor blade to meter matrix and a chopper to meter and dispense discontinuous fibers as is shown in FIG. 1B. Continuous fiber reinforcement could also be introduced, and the matrix could be pumped in with metering pumps and spread across the width of the product instead of being dispensed by doctor blades. In FIG. 1B the "entry-exit roll" is an idler roll carrying the film, and the "carrier roll" has a scraper to keep the FRP with the film and not allow it to stick to the "carrier roll" and follow it around.

The apparatus 100 of FIG. 1A defines a volume 102 as the converging space between two rollers 104 (entry-exit roll), 106 (shear-pump roller) disposed parallel to one another where the liquid matrix 108 (with fibers 112 mixed in) enters. The inlet is merely the entry space between the rollers 104, 106. The opposing sides of the volume 102 converge to form a gap 110 (entry gap) for the liquid matrix 108 and the fibers 112 to pass. As shown the two cylindrical surfaces of the rollers 104, 106 form opposing sides of the volume 102 and the gap 110 therebetween. In this embodiment, the moving surface is the cylindrical surface of the shear-pump roller 106, which is in contact with the liquid matrix 108 and the fibers 112 and moving with respect to the liquid matrix 108 and the fibers 112 through the gap 110 such that shear force is transferred to the liquid matrix 108 and the fibers 112 pushing the liquid matrix 108 and the fibers 112 forward through the gap 110, creating currents in the liquid matrix 108 and increasing pressure in the liquid matrix 108 within the volume 102 in a forward direction. The increased pressure within the volume 102 forms a barrier to entrained gases within the liquid matrix 108 such that the entrained gases are inhibited from passing through the gap 110 along with the liquid matrix 108 and the fibers 112. In this example embodiment, a second volume 116 for the liquid matrix 108 after the gap 110 and is enclosed by the pair of rollers 104, 106, a scraper 114, side dams (at each end of rollers 104, 106) and a carrier roller 118 and an outlet 120 (exit gap) for the liquid matrix 108 from the second volume 116 is formed between one of the pair of rollers 104 and the carrier roller 118. As known in the art, a scraper 114 includes a blade in contact with a roller to wipe liquid matrix 108 from the cylindrical roller surface as it passes. Pressure in the liquid matrix 108 is higher in this second volume 116. A film 122 enters the gap 110 on one of the pair of rollers 104 and passes through the outlet 120 (of the second volume 116) on the carrier roller 118. The embodiment of FIG. 1B also includes a second film 124 which enters a film gap between the carrier roller 118 and the scraper 114 to sandwich the liquid matrix 108 and fibers 112 with the first film 122 at the outlet 120. All other elements the embodiments of FIGS. 1A and 1B are identical.

Figure 2A:
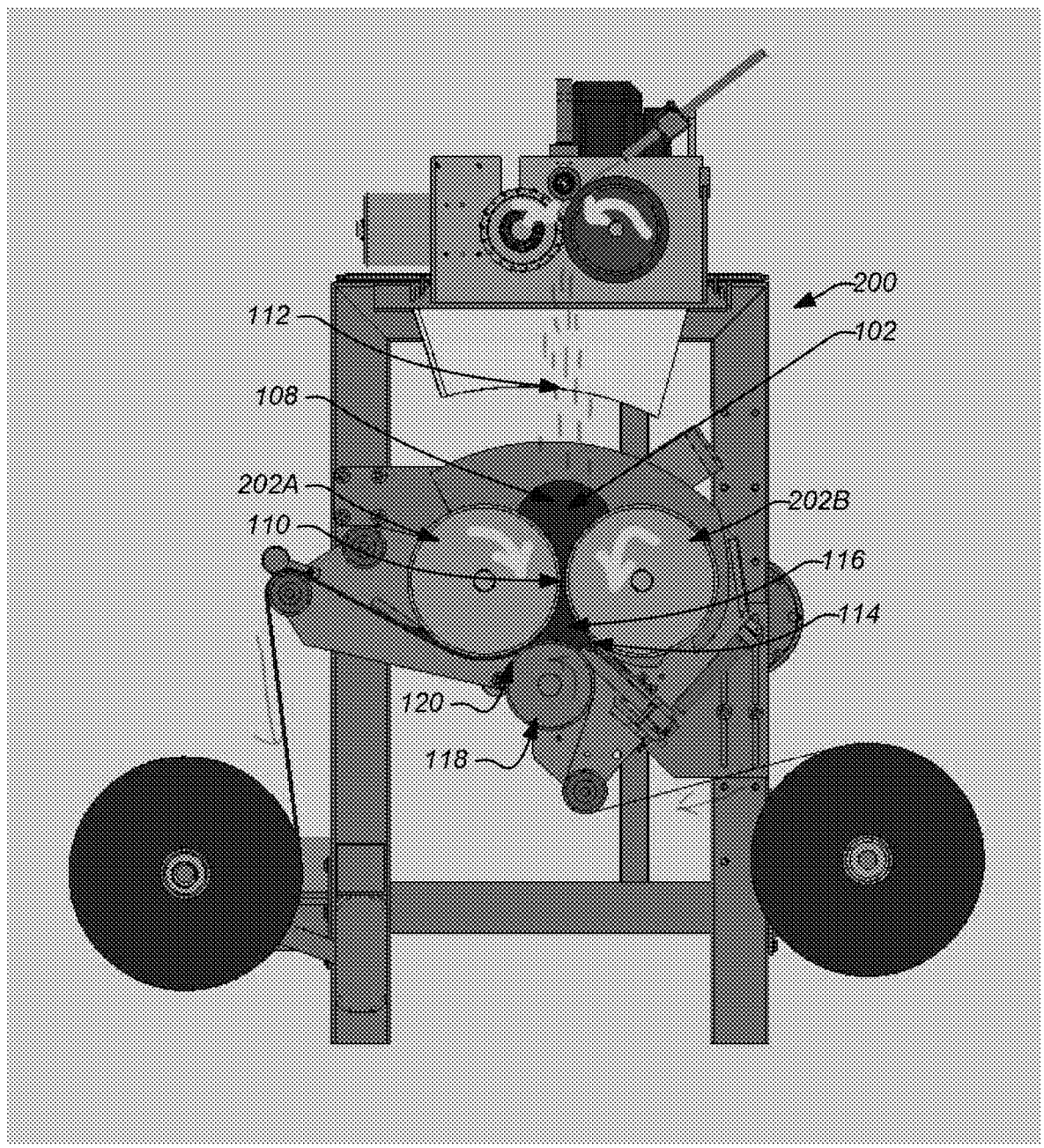
FIG. 2A shows an impregnator embodiment of the invention employing two "shear-pump rollers" with a single film entering the impregnator on its right introduced into the "pressure zone" by the "carrier roll," and a chopper for introducing discontinuous fibers.
Figure 2B:
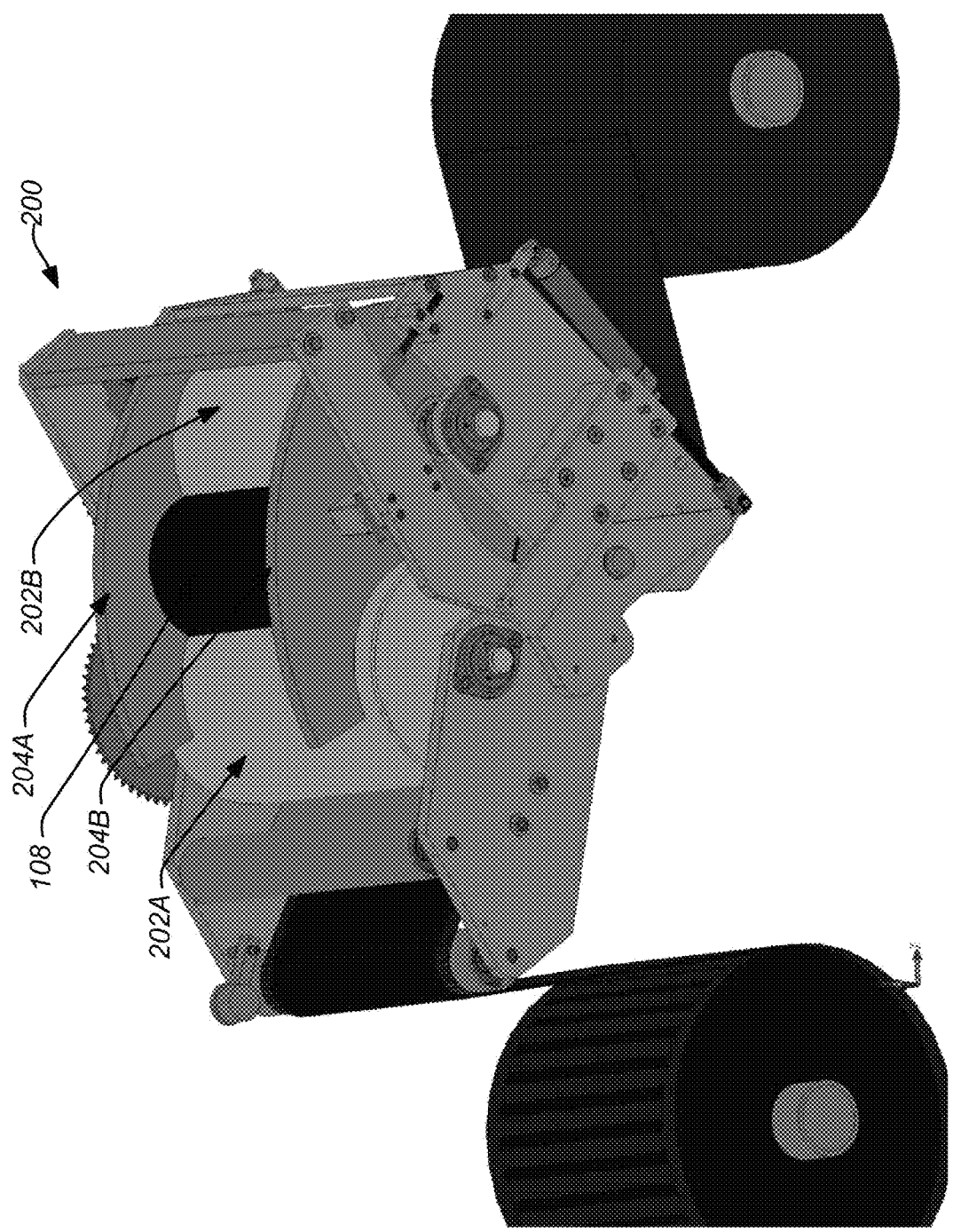
FIG. 2B is an isometric view of the impregnator in FIG. 2A, shown without the chopper, so, in this view, the reinforcement could also be continuous mat.

FIGS. 2A and 2B show an impregnator 200 embodiment of the invention employing two "shear-pump rollers", a single film, and a fiber chopper, shown only in FIG. 2A. In FIG. 2A, the winder, on the left side, packages the FRP. It should be noted that a final scraper should ideally be positioned by the exit gap. The arrangement shown in FIG. 1A, may yield excessive stress on the film from the left shear-pump roller. In FIG. 2B the means for metering the matrix is not shown, but it could by metering pumps feeding through an in-line mixer. In this embodiment, both rollers forming the inlet are driven, i.e. are "shear-pump rollers." Here also, the "carrier roller" takes the film into the "pressure zone" and carries the now impregnated FRP through the "exit gap" on the left. A scraper on the "entry-exit roll" to the left keeps the FRP from sticking to it, forcing it to stay with the film. As with all embodiments herein, the increased pressure in the "pressure zone" and leading up to the "entry gap" forms a barrier to entrained gases within the resin such that the entrained gases are inhibited from passing through the "entry gap" with the viscous resin. Also, the currents generated by the fast-moving rolls stir up the composite and make it more uniform. Thus, impregnation of the fibers with the resin is improved.

In the embodiment of FIGS. 2A and 2B, the volume 102 is now formed between the cylindrical surfaces of a pair of shear-pump rollers 202A, 202B. Fibers 112 are dropped into the liquid matrix 108 from a cutter above. The gap between the rollers 202A, 202B functions as the gap between the rollers 104, 106 of FIGS. 1A and 1B, although both rollers 202A, and 202B are driven here. In this case, the surface of each roller 202A, 202B provides a moving surface to drive the liquid matrix 108 and fibers 112 into the gap 110. Here also a second volume 116 is employed after the gap 110 enclosed by the pair of rollers 202A, 202B, a scraper 114, side dams (at each side of rollers 104, 106) and a carrier roller 118 and an outlet 120 (exit gap) for the liquid matrix 108 from the second volume 116 is formed between one of the pair of rollers 202A and the carrier roller 118. FIG. 2B illustrates side dams 204A, 204B. As shown, the side dams 204A, 204B are disposed against the cylindrical surface of one of the shear pump rollers 202A but against the sides of the other shear pump roller 202B.

Figure 3A:
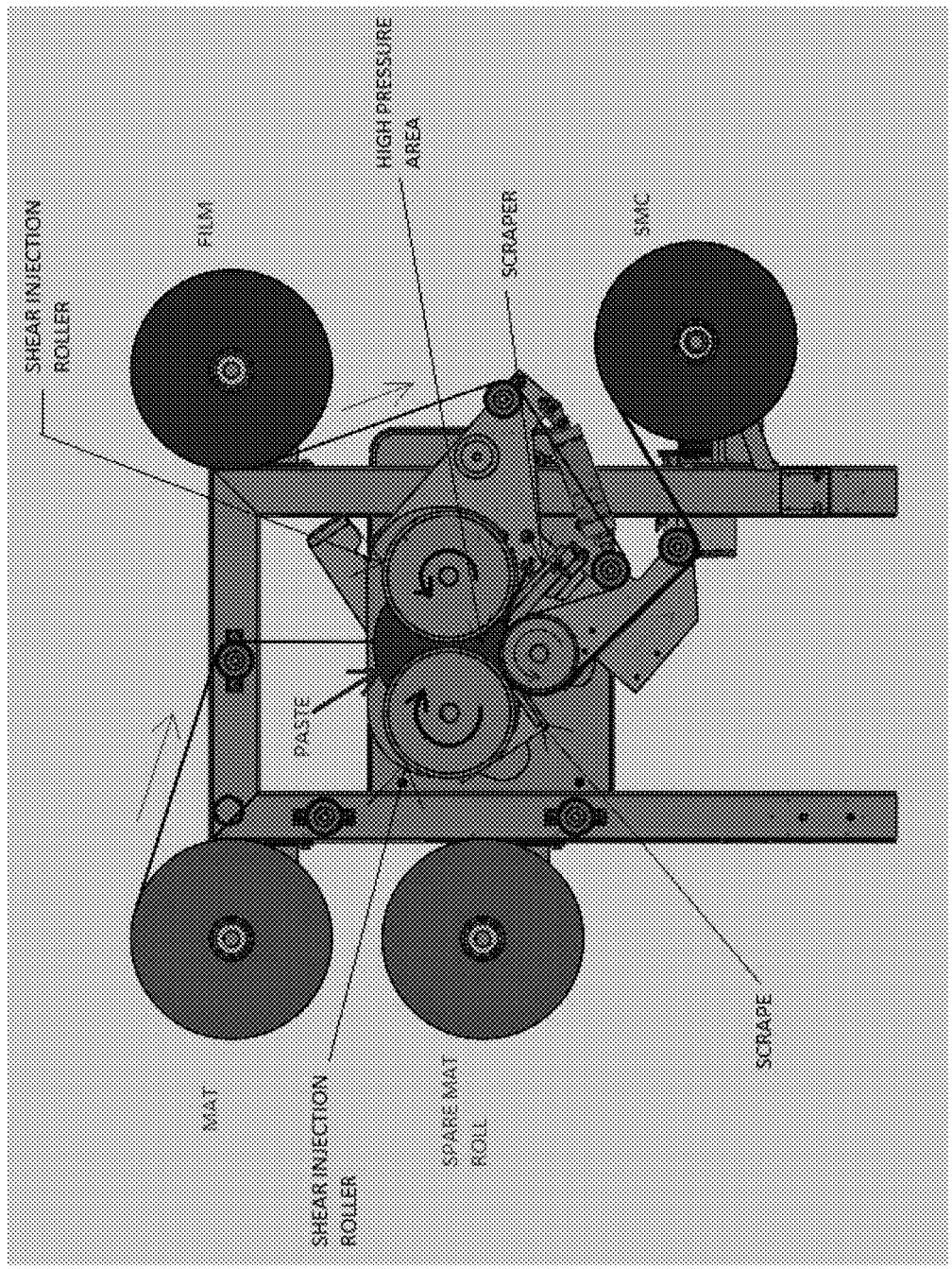
FIGS. 3A and 3B show an impregnator embodiment of the invention in cross section employing two "shear-pump rollers" and one carrier film. Mat is used for reinforcement.
Figure 3B:
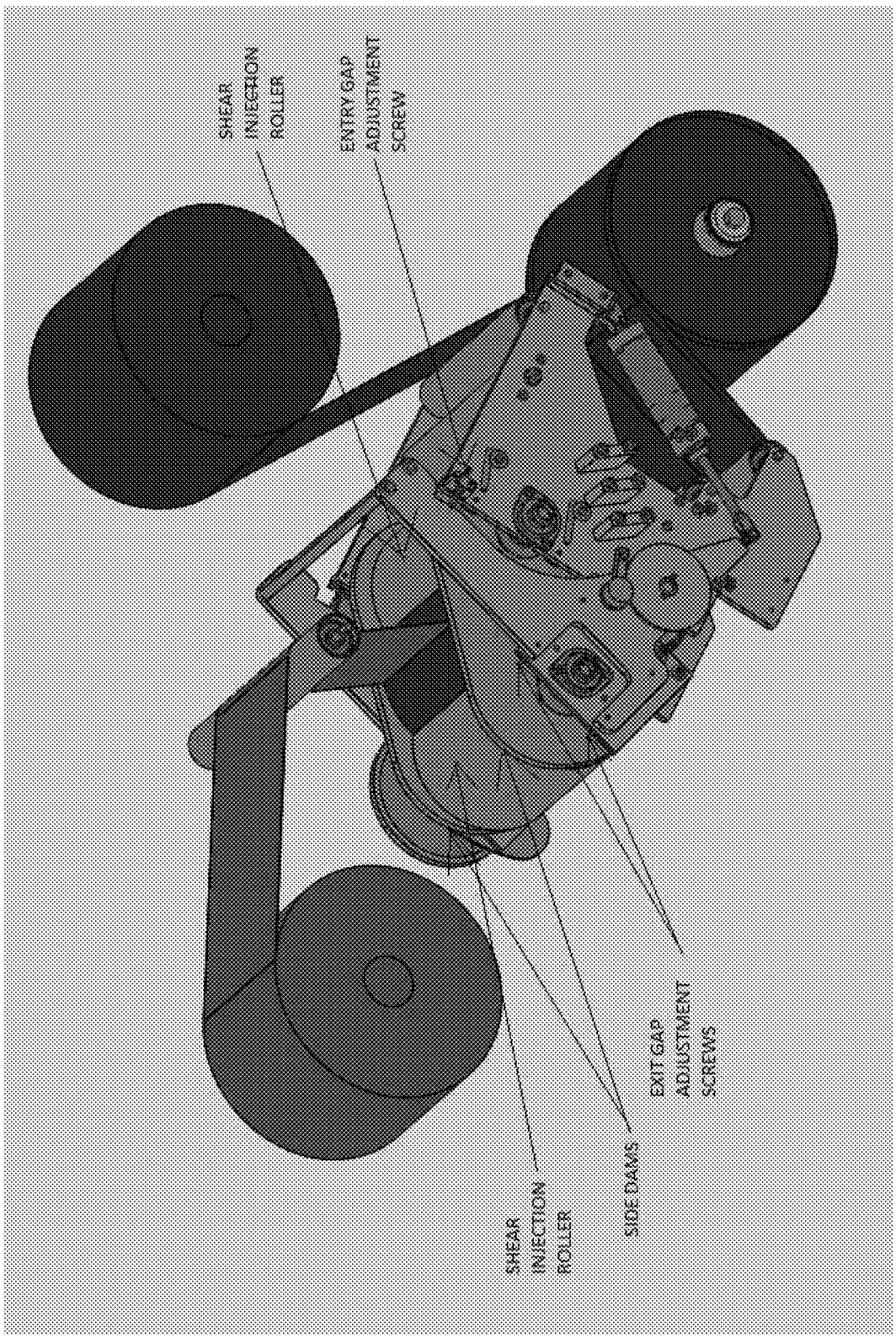
Figure 3C:
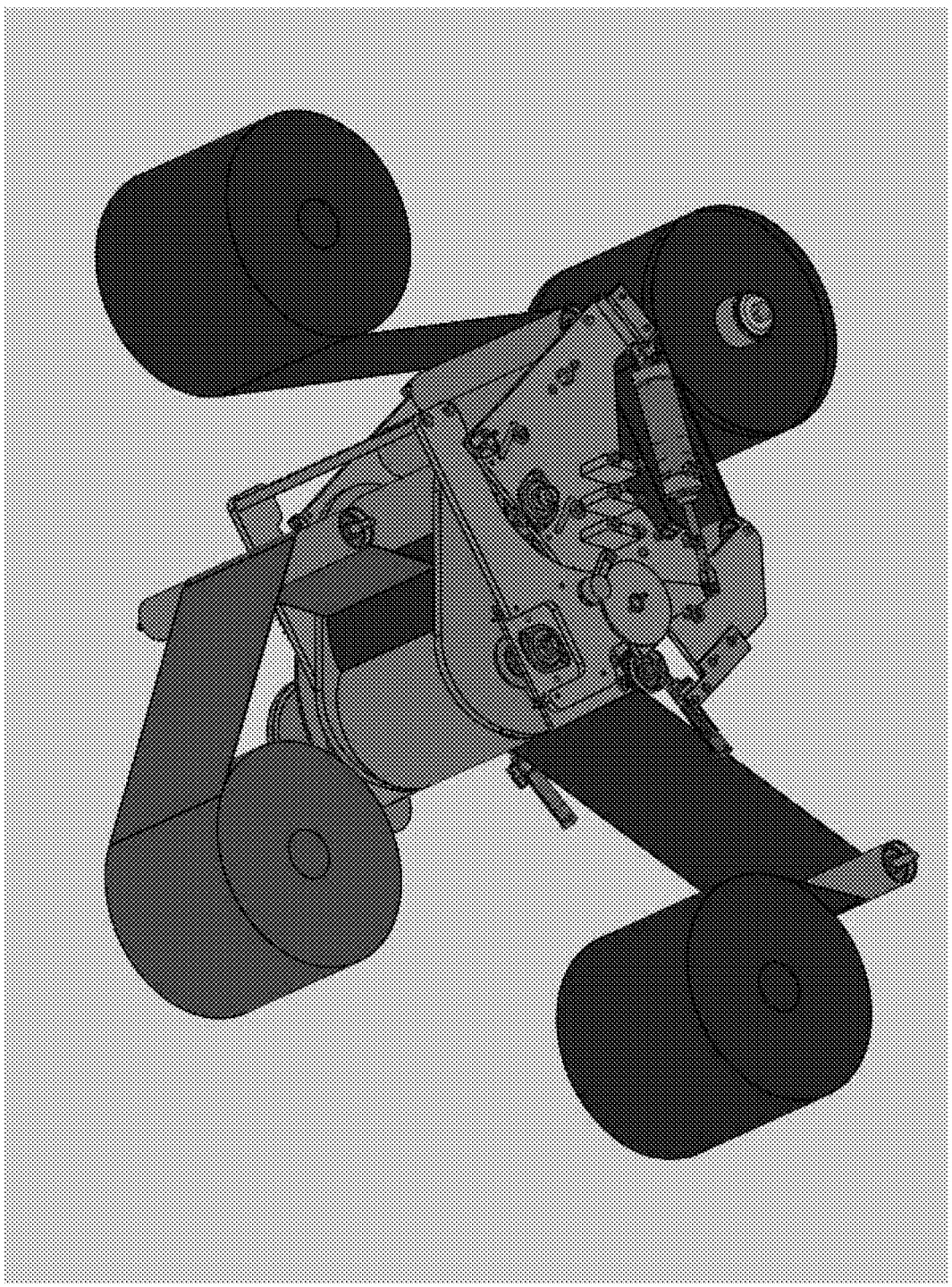
FIGS. 3C, 3D, and 3E are the same unit as shown in FIGS. 3A and 3B but with a second film pressed into the FRP past the "exit gap."
Figure 3D:
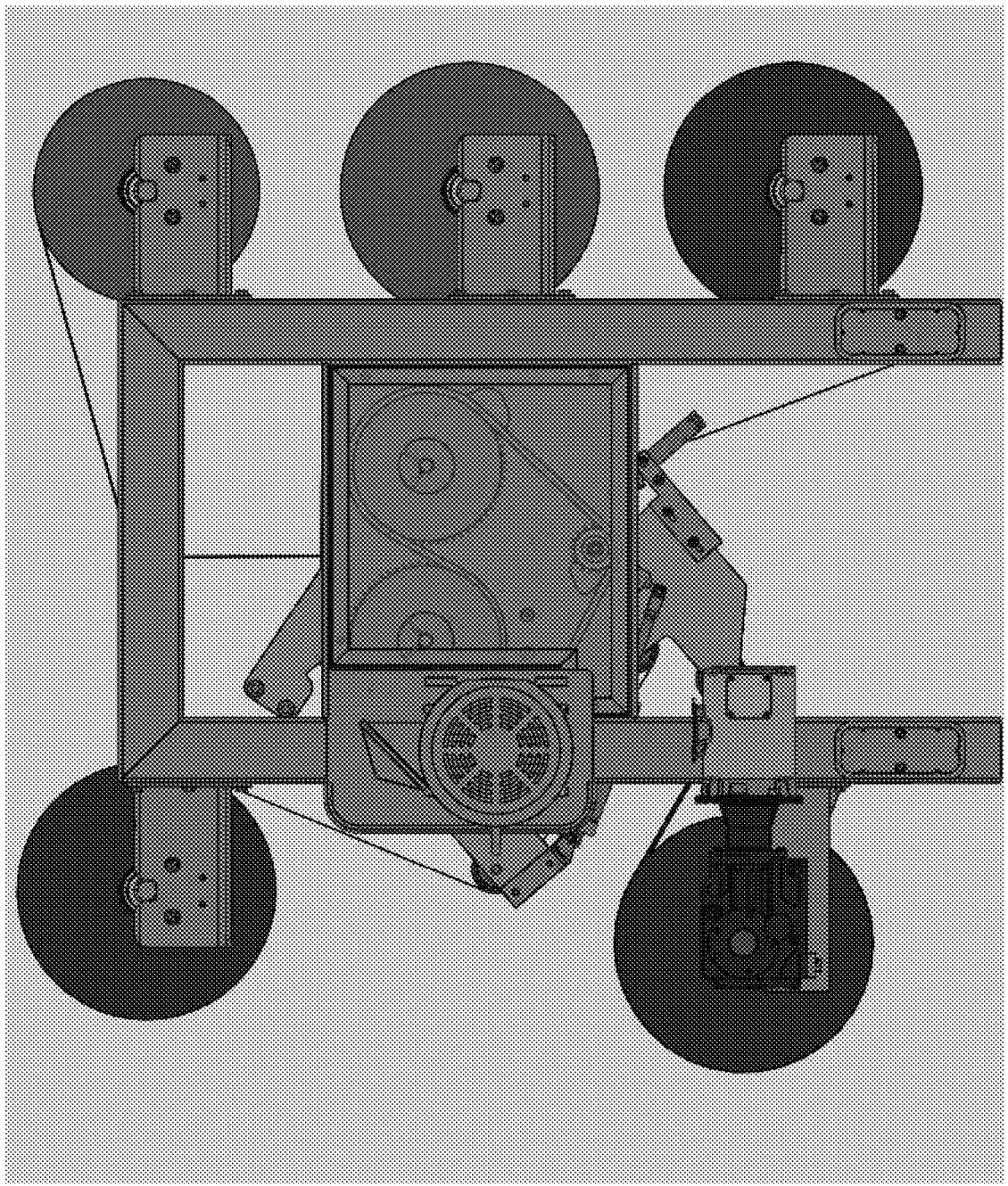
Figure 3E:
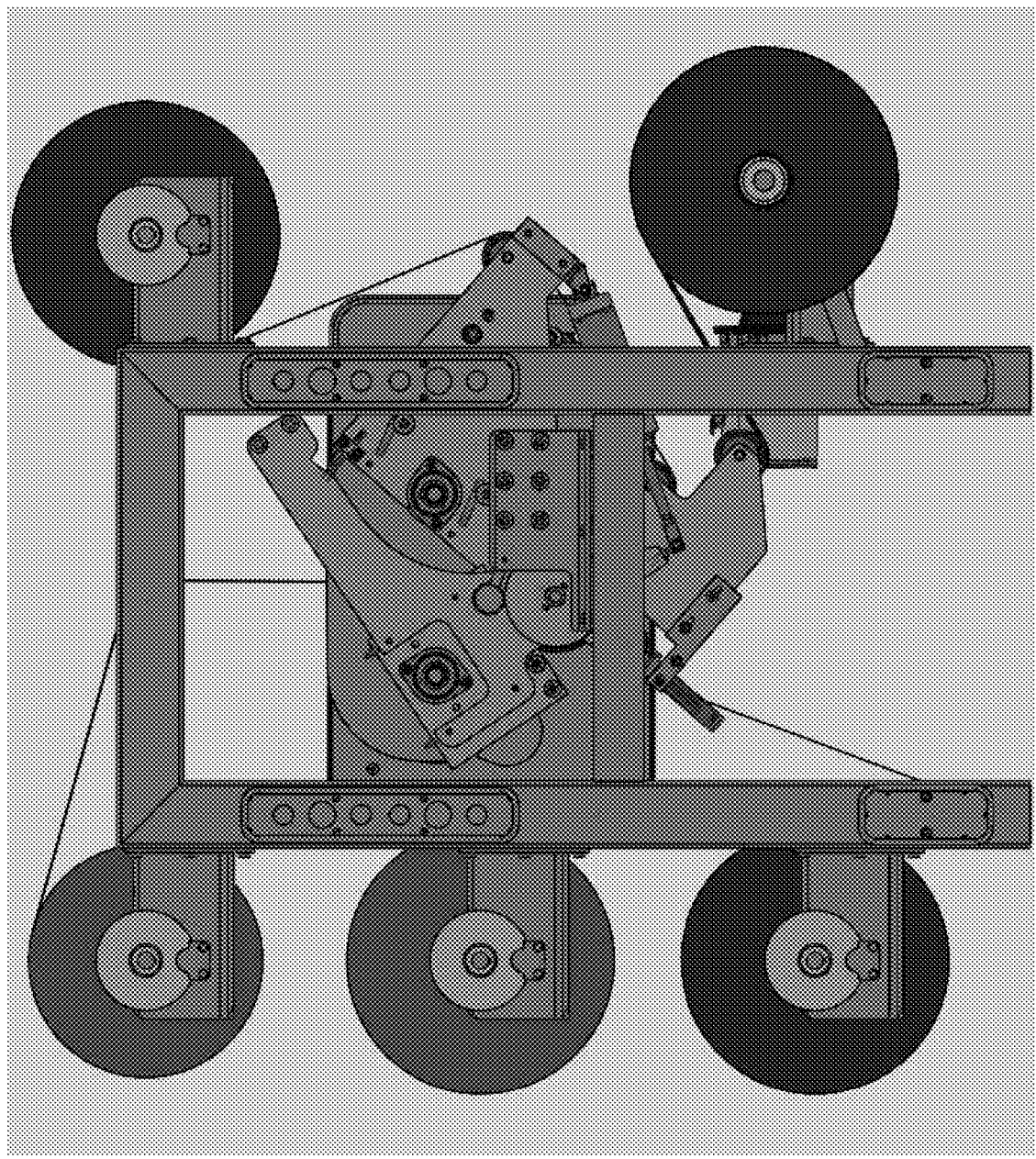

FIGS. 3A to 3E show impregnator embodiments of the invention employing two "shear-pump rollers," and one mat (with one standby spare mat roll) and one carrier film. In this embodiment, the fiber reinforcement is continuous mat delivered from the mat roller directly between the two driven rollers into the inlet of the high pressure volume. No chopped fibers are introduced, although they could be. Impregnation of the fibers of the mat is improved by "pressure barrier" preventing entrained air or from entering the "pressure zone." Also, currents in the matrix generated by the high-speed rollers put the matrix in more intimate contact with the fiber mat. The resin-impregnated mat is pulled through the "exit gap" with the film by the winder. A scraper working against the "entry-exit roll" forces the matrix to stay with the mat and film, keeping it from sticking to the "entry-exit" roll and following it around. FIGS. 3D and 3E show views of the same embodiment from both sides complete with the structural frame. These embodiments employ elements functioning as described in the embodiments of FIGS. 1A, 1B, 2A and 2B and identifiable in the figures as will be understood by one skilled in the art.

Figure 3F:
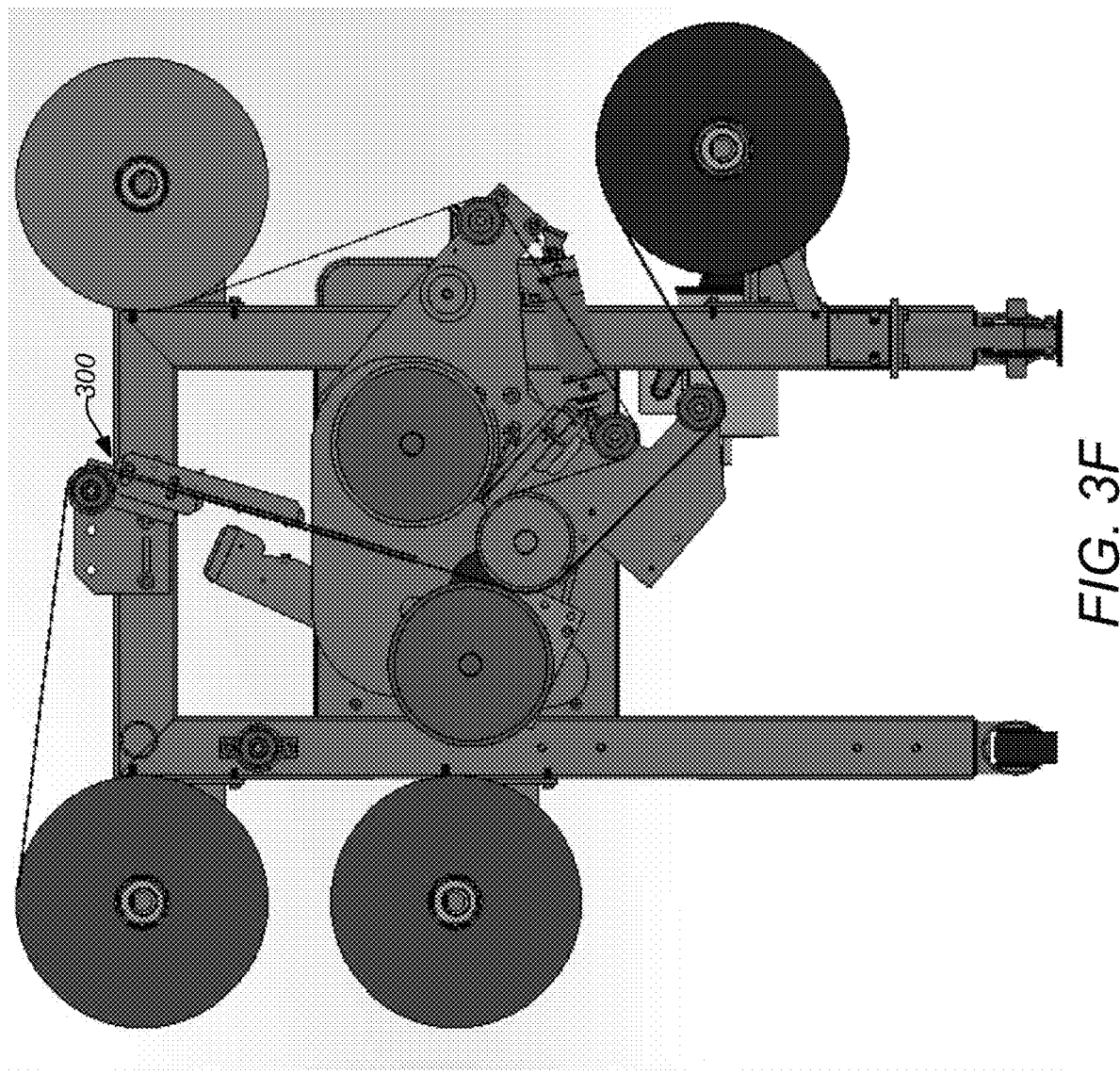
FIG. 3F is the same unit opened up for low-pressure impregnation; the unit includes a guide to introduce woven roving which prevents the woven roving from wrinkling and jamming the equipment.
Figure 3G:
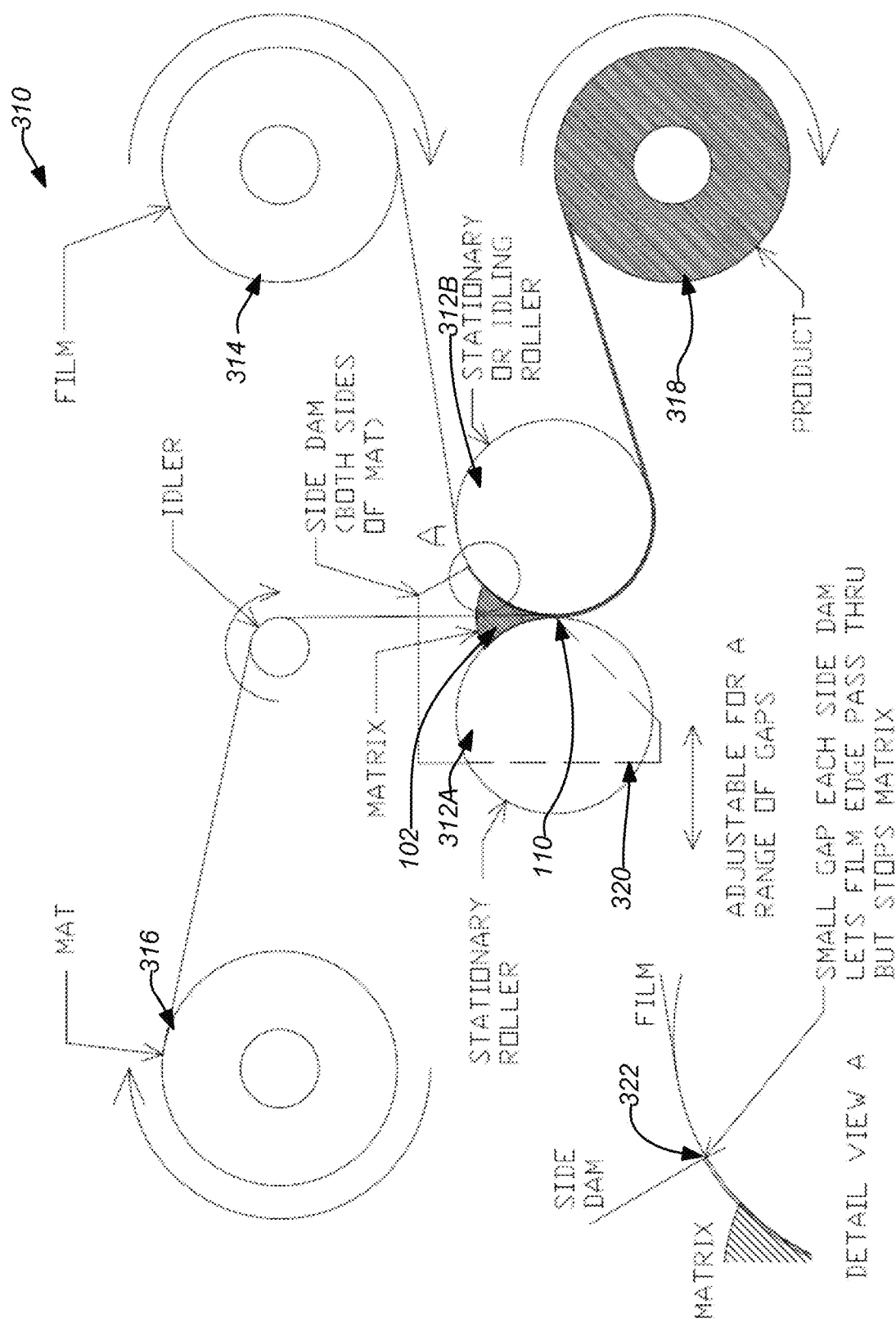
FIG. 3G. is a schematic representation of simplified equipment, which would function as in FIG. 3F, but eliminating driven rollers, which are not used there.

FIG. 3F is a unit similar to the embodiments of FIGS. 3A to 3E but opened up for low-pressure impregnation. In this case, a second volume is not employed as sufficient impregnation and air elimination occurs through the first gap 110. Here, the unit includes a guide 300 to introduce woven roving which prevents the woven roving from wrinkling and jamming the equipment. FIG. 3G. is a schematic representation of simplified equipment, which would function as in FIG. 3F, but eliminating driven rollers, which are not used there.

FIG. 3G is a schematic of a device 310 for low pressure impregnation employing only a first volume 102 and a single gap 110 between two cylindrical surfaces 312A, 312B. It is important to note that in this case the rollers 312A, 312B may be stationary. Particularly, the left roller 312A can be stationary, whereas the right roller 312B can be either stationary or merely idling (moving with the film 314 running over its surface). The film 314 and mat 316 materials are both pulled onto the driven product winder 318. Thus, the film 314 is the moving surface in contact with the liquid matrix 108 which pressurizes the gap 110 to eliminate air and impregnate the mat as previously described. The mat, 316, also drags matrix 108 through the gap 110, with the same effect. The schematic also shows the outline of the dams 320 on each side of the volume 102. As with previous embodiments, here the dams run against the sides of one roller 312A and against the cylindrical surface of the other roller 312B. There is a small film gap 322 between the dams 320 and the cylindrical surface of the roller 312B which allows the film 314 to pass by while preventing the liquid matrix 108 from passing. Accordingly, the edges of the film 314 extend through this film gap 322 beyond the dams 320.

4. Applications for Dip Tanks

Detailed description of various examples employing "shear-pump rollers" in dip tank systems are described in this section. In the case of the dip tank applications, a "pressure barrier" and currents are formed within a tank of liquid (e.g. resin), and a continuous fiber or mat is passed through this "pressure barrier" with currents. In some embodiments, scraper(s) are used to form a "pressure zone" after an "entry gap" increasing the pressure gradient leading up to the "entry gap" and creating a high-"pressure zone" following it with confined currents in the matrix. In other embodiments, no scrapers are used, and there is no enclosed high-"pressure zone." However, there is still a "pressure barrier" and currents leading to a gap formed by either two "shear-pump rollers" or one "shear-pump roller" and a baffle, because the "shear-pump rollers" push more matrix toward the "entry gap" than can pass through. After the gap, the pressure in the matrix and the currents go back down as the "shear-pump rollers" draw matrix away. The principals of exclusion of entrained air with "pressure barriers" are the same with dip tanks as they are with pressure impregnators described previously as is the source of the currents.

A dip tank embodiment of the invention can comprise a pair of driven "shear-pump rollers" disposed parallel to one another and having a gap therebetween, a tank of fluid having the pair of rollers immersed therein, side dams, and a continuous fiber reinforcement passed between the pair of rollers at "line speed." In one instance, a "pressure zone" is formed in the matrix beneath the two "shear-pump rollers" by scrapers on each impregnation roller, separated by a small "exit gap" through which the fiber reinforcement passes. In another, the scrapers and "exit gap" are eliminated, so no enclosed "pressure zone" is formed, although there is still a "pressure barrier" at the entry gap and currents generated in the matrix on both sides of it.

Without the "pressure zone," the pressure at the "entry gap" is reduced, so the "pressure barrier" to air is correspondingly diminished for any given "shear-pump roller" rotational speeds. However, the equipment is simpler and could be more reliable. In addition, the deficit in the "pressure barrier" with no "pressure zone" could be overcome by higher roller speeds. With or without the "pressure zone", since the equipment is immersed in the matrix, the scrapers and side dams do not have to seal tightly against the rollers, since a small amount of leakage would harmlessly end up back in the matrix.

While the "pressure barrier" can be effective in excluding air with this embodiment of the invention, the currents in the liquid resin matrix can also be important in taking the excluded air away. This embodiment of the invention affords various configurations and parameters that can be adjusted to optimize its function and possibly to overcome issues that are not foreseen. As an example of an unforeseen problem, in existing treater lines, sometimes air from the fiber reinforcement forms bubbles in the tank that have to be kept out of the way of the passing cloth to prevent defects. Firstly, since each roller can rotate in either direction, there are four possible configurations of roller rotation, and each can be implemented with or without the "pressure zone," making eight possible configurations. FIGS. 6A to 6H show eight possible configurations for a dip tank embodiment of the invention as discussed above. Also, the speeds of each roller can be varied continuously and independently. The "exit gap," where present, and the "entry gap," both can be adjusted, and the depth of the impregnator below the surface of the matrix can be changed.

Figure 4A:
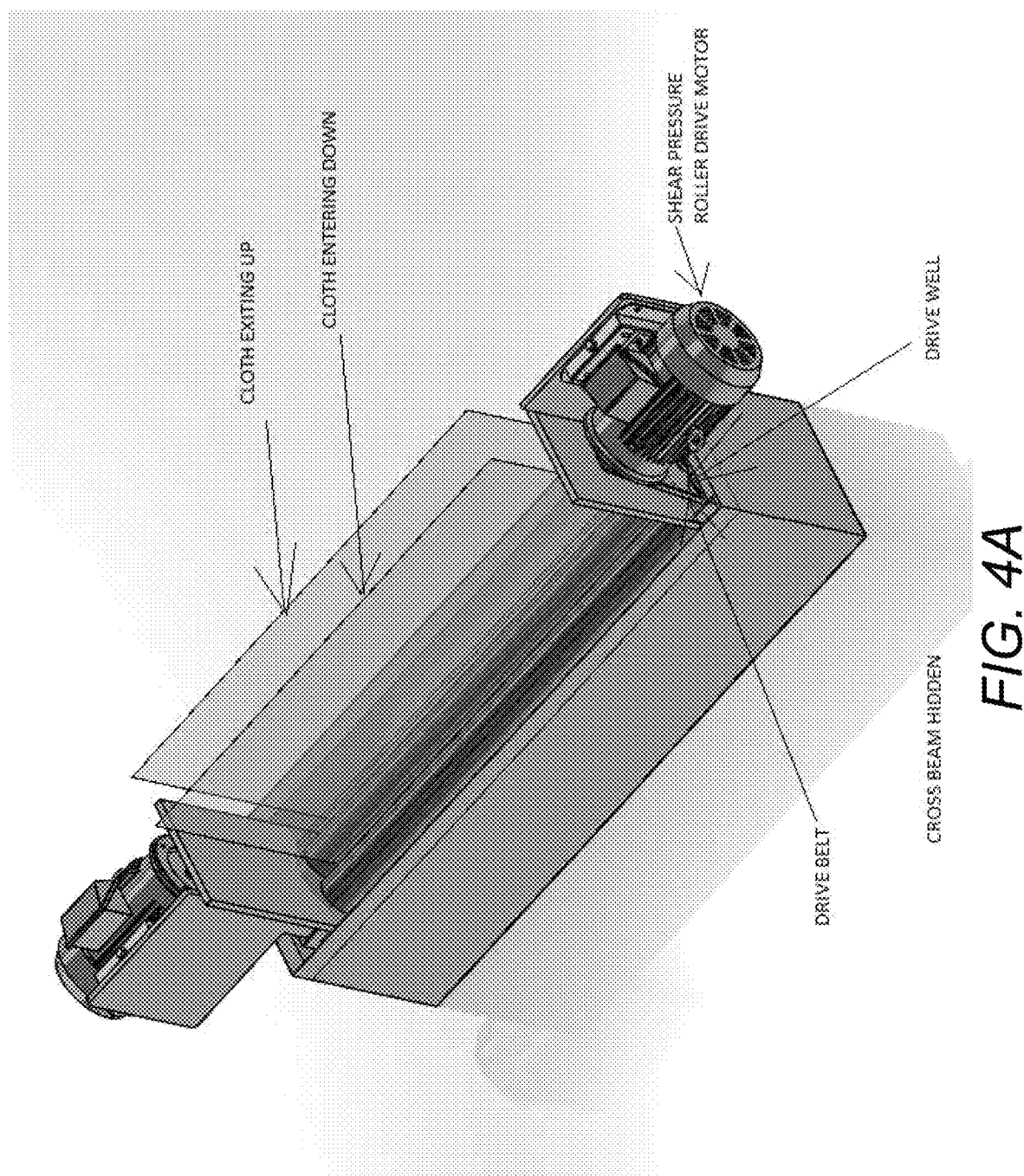
FIGS. 4A to 4C show a dip tank embodiment of the invention with two shear-pressure rollers and an idler roll and no "pressure zone."
Figure 4B:
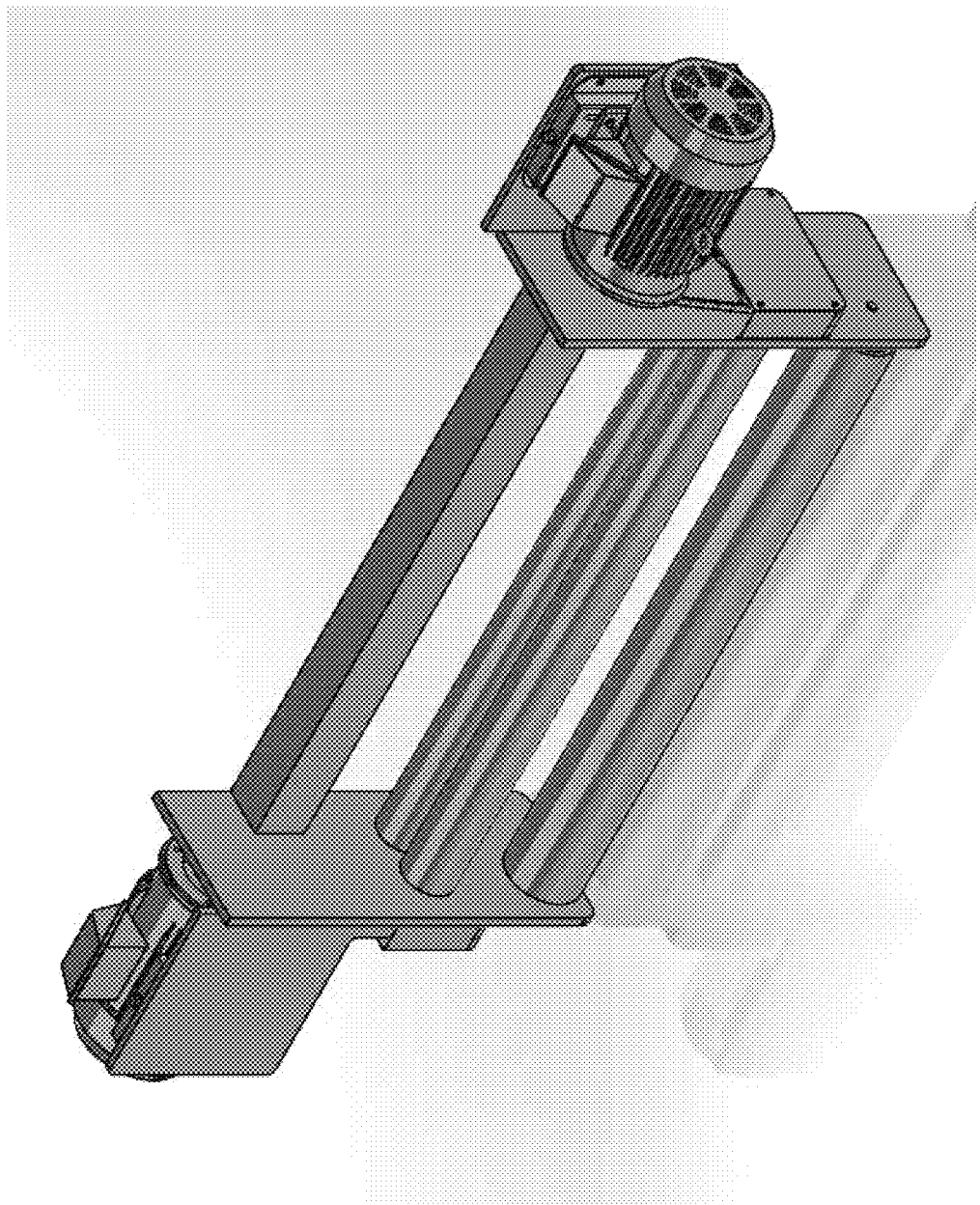
Figure 4C:
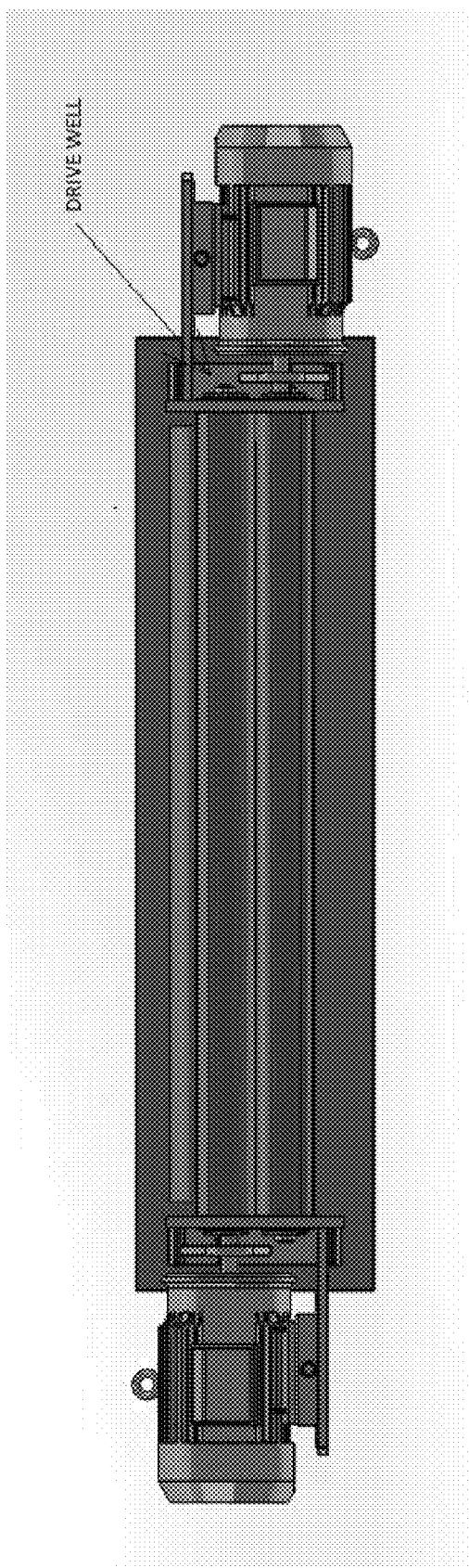
Figure 5A:
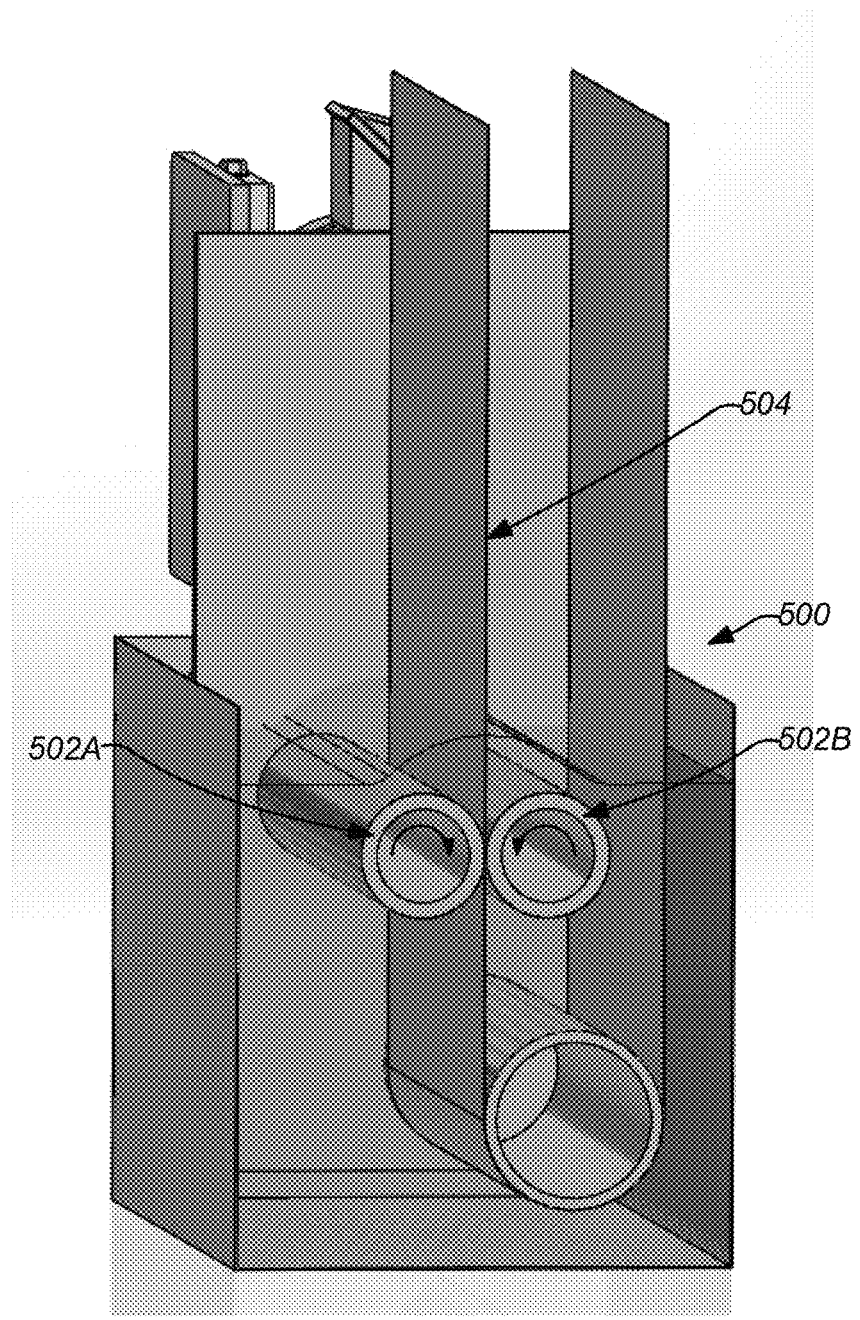
FIG. 5A is a cross-sectional view of FIG. 4A showing the resin as it would be with the "shear-pump rollers" rotating opposite each other in the sense of pushing the matrix forward.
Figure 5B:
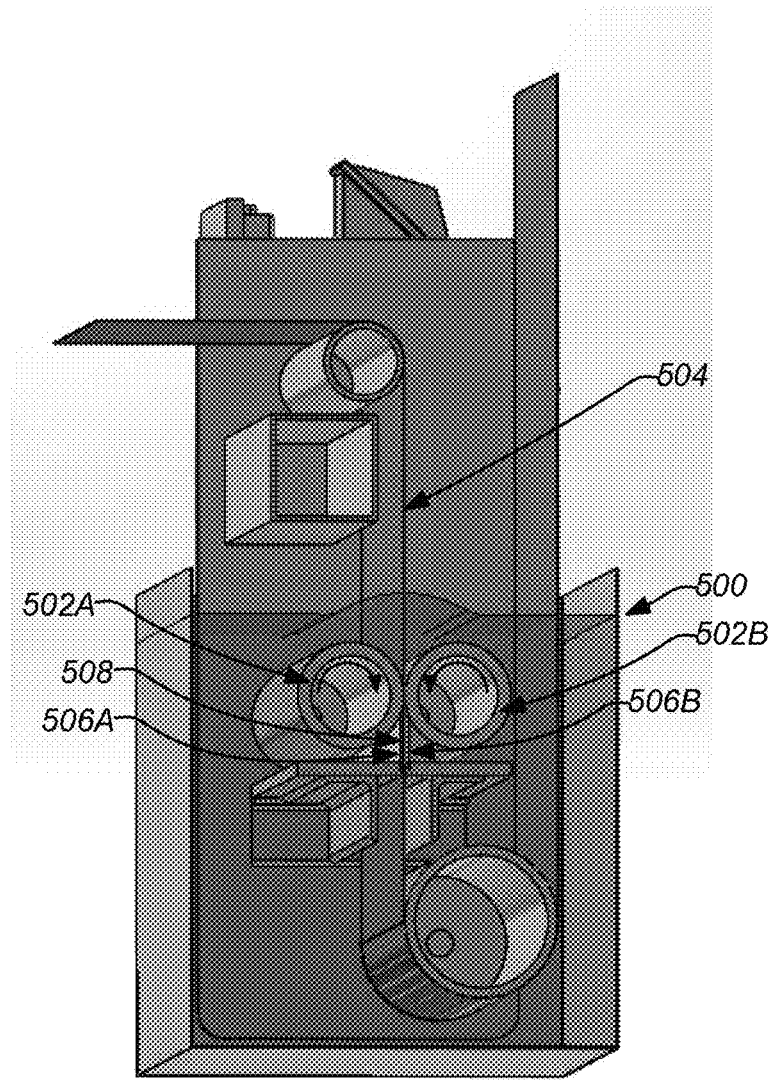
FIG. 5B is the same as FIG. 5A, but with a pressure zone with two scrapers added.
Figure 5C:
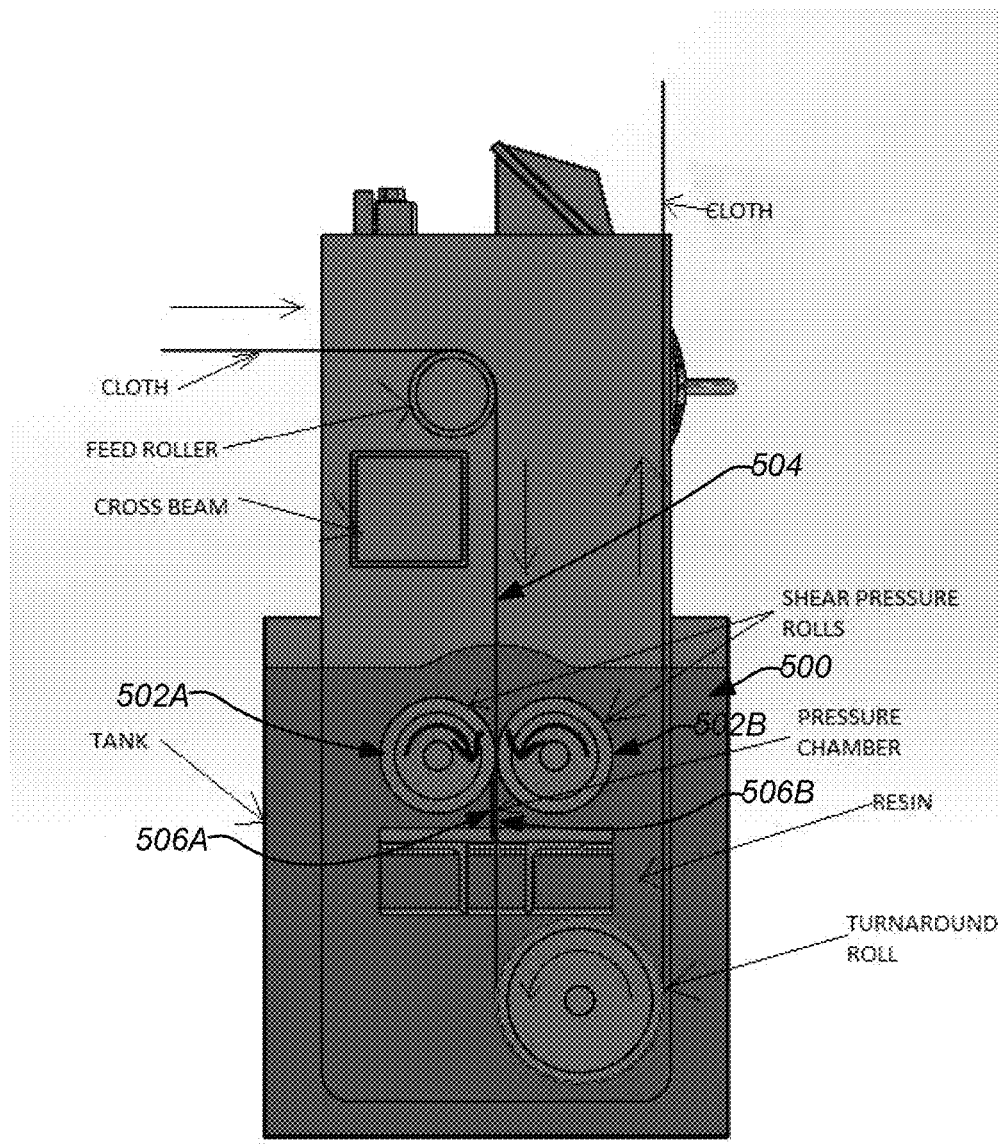
FIG. 5C is the same as FIG. 5B with labels showing the different functional elements.
Figure 5D:
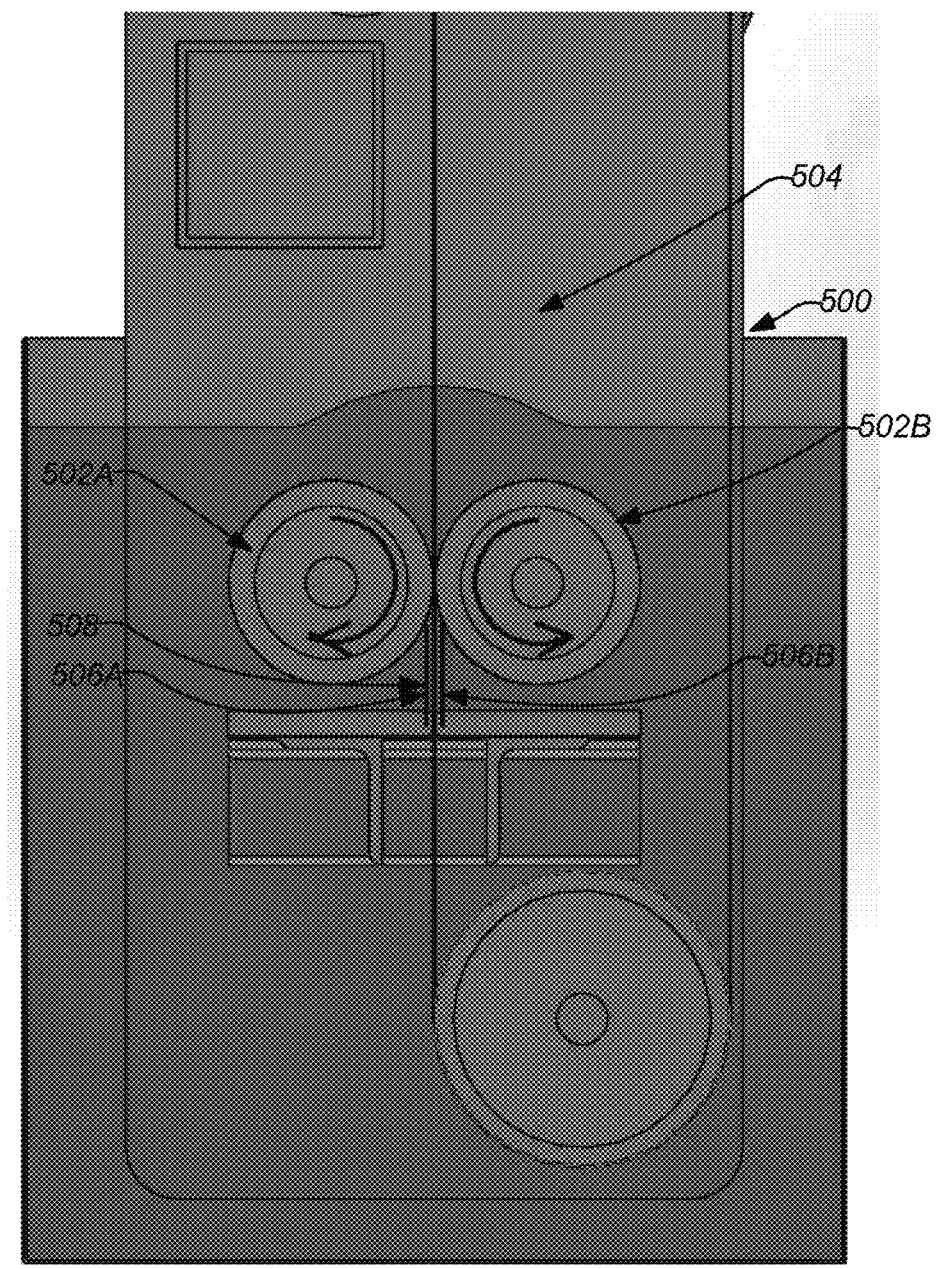
FIG. 5D is an enlargement of FIG. 5C without the labels.
Figure 5E:
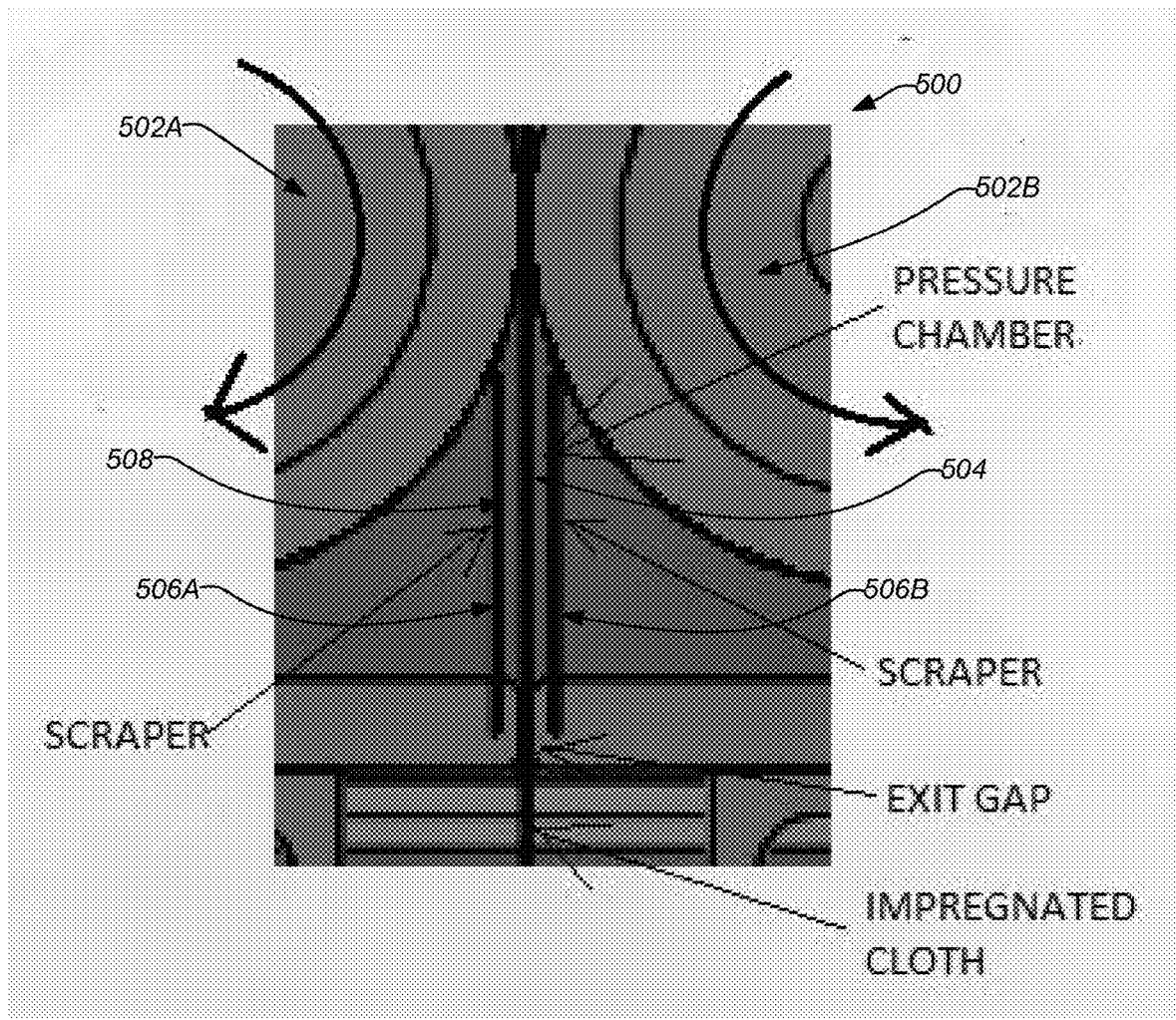
FIG. 5E is the same configuration with a close-up of the pressure chamber.

FIGS. 4A and 4C shows a dip-tank embodiment with 4B showing the impregnation insert into the dip tank by itself. FIGS. 5A to 5J show additional detail of the dip tank embodiments of the invention. FIG. 5A shows an apparatus 500 where two "shear-pump rollers" 502A, 502B (driven) rotating oppositely in the same sense as the fiber mat 504 travel without scrapers or an enclosed pressure area (second volume) following. FIG. 5B shows the same apparatus with two scrapers 506A, 506B (edges running against the fiber mat and liquid matrix) and an enclosed "pressure zone" 508 (second volume, formed by left and right scrapers 506A, 506B enclosing the mat 504) following the "shear-pump rollers" 502A, 502B. The scrapers 506A, 506B have edges contacting the shear pump rollers 502A, 502B above, are supported by structure with outlet below, and form a pressurized second volume 508. FIG. 5C is a cross-section view of FIG. 5B, FIG. 5D is an enlarged detail view of FIG. 5C, and FIG. 5D is the "pressure zone" 508 further enlarged showing the left and right scrapers 506A, 506B.

Figure 5F:
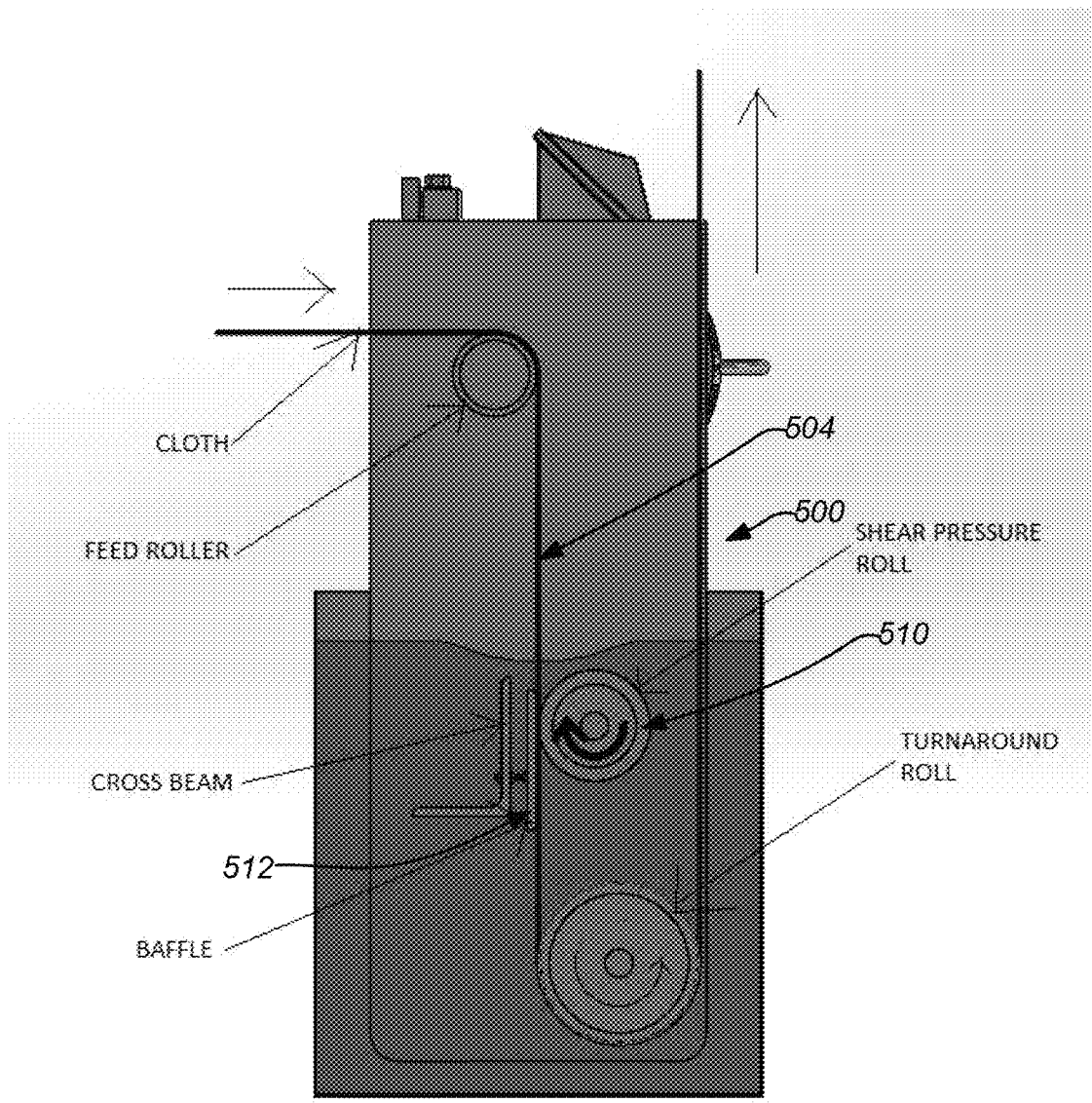
FIG. 5F is a configuration with a single "shear-pump roller" working against a baffle instead of another "shear-pump roller." The shear-pump roller is shown rotating against the direction of movement of the fiber reinforcement.
Figure 5G:
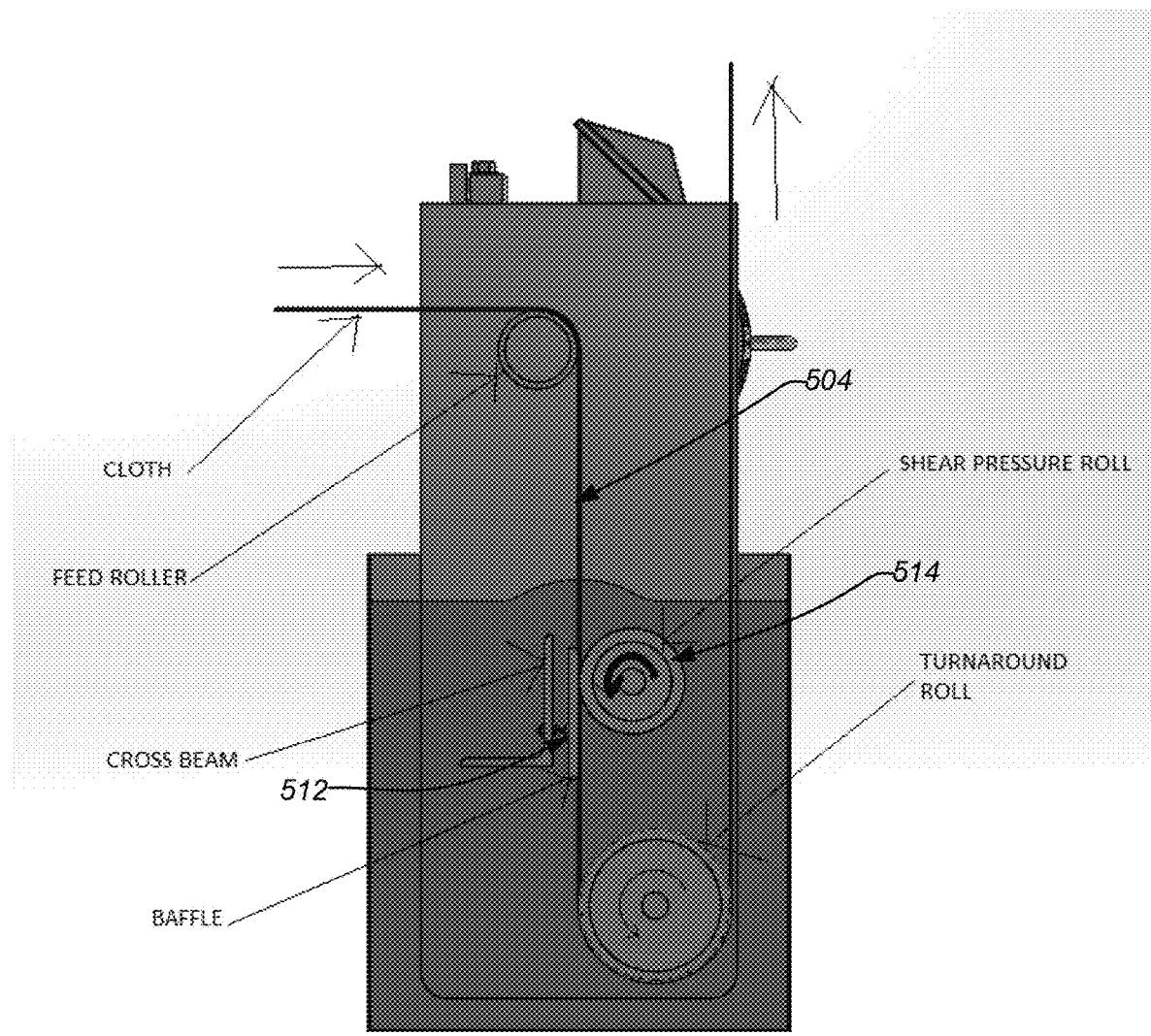
FIG. 5G is the same configuration as FIG. 5F shown with the shear-pressure roll rotating in the sense to push the matrix forward.
Figure 5H:
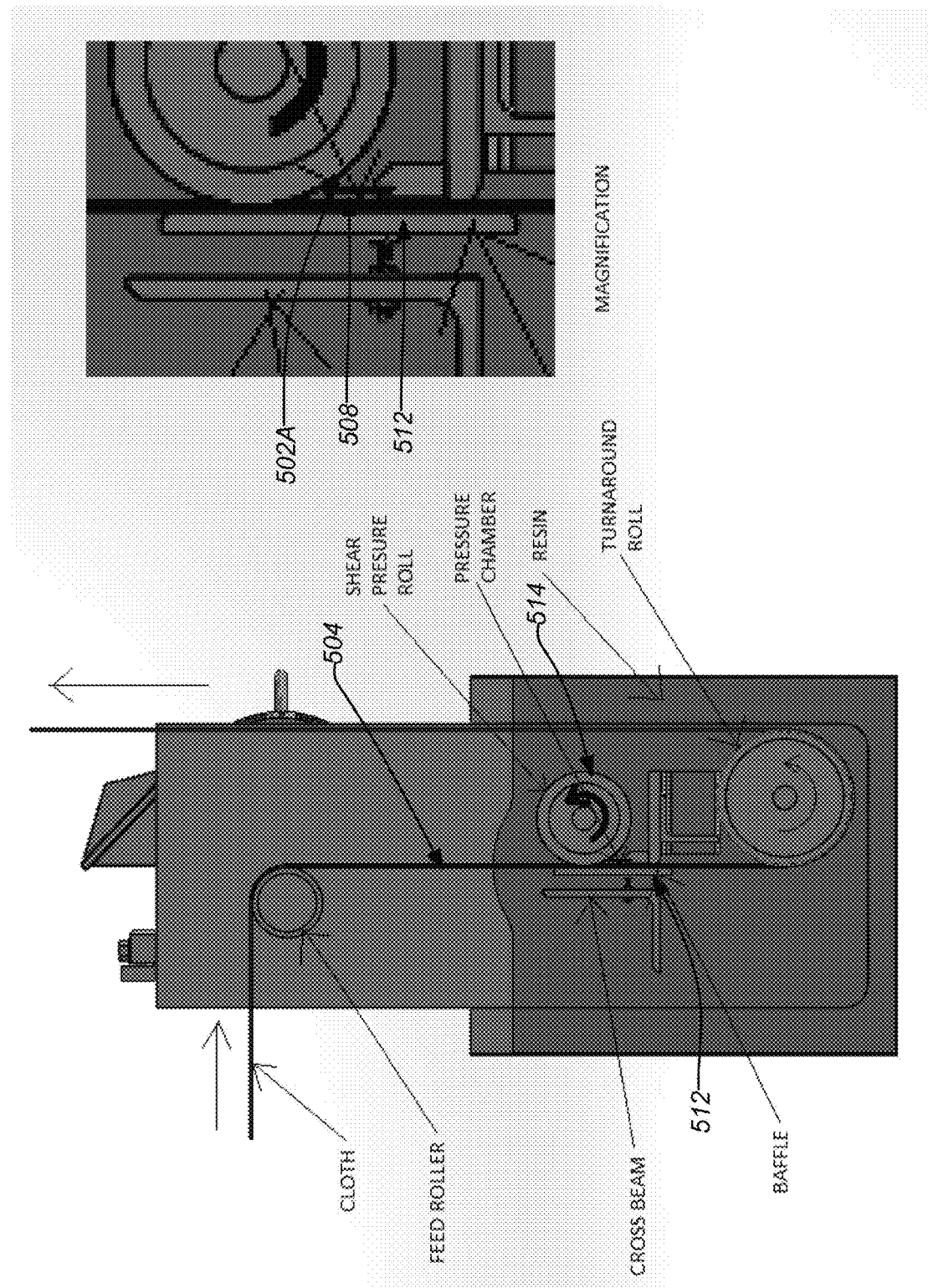
FIG. 5H is the same as FIG. 5G but with a pressure chamber with one scraper.
Figure 5I:
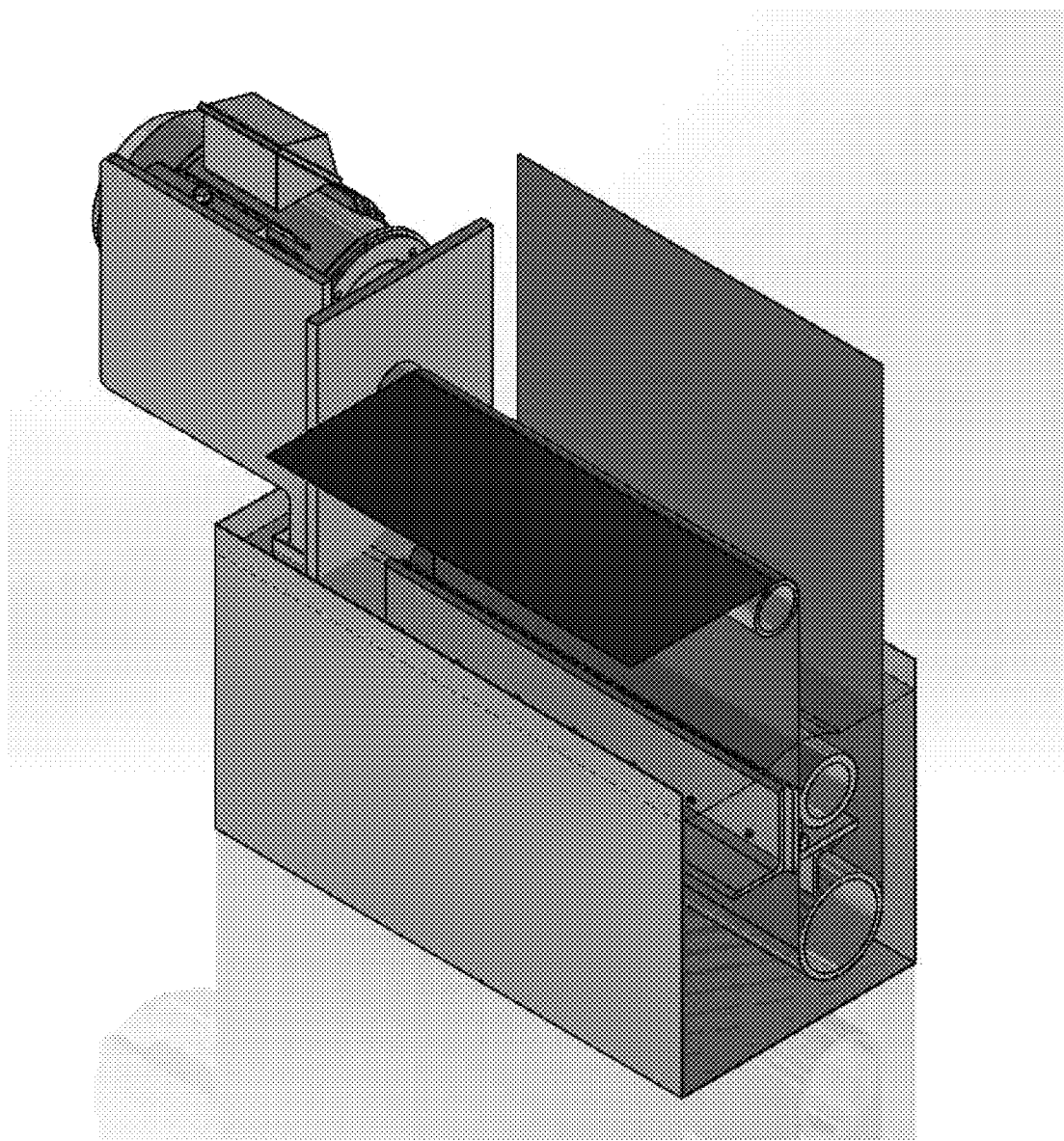
FIG. 5I is an isometric view of FIG. 5H.
Figure 5J:
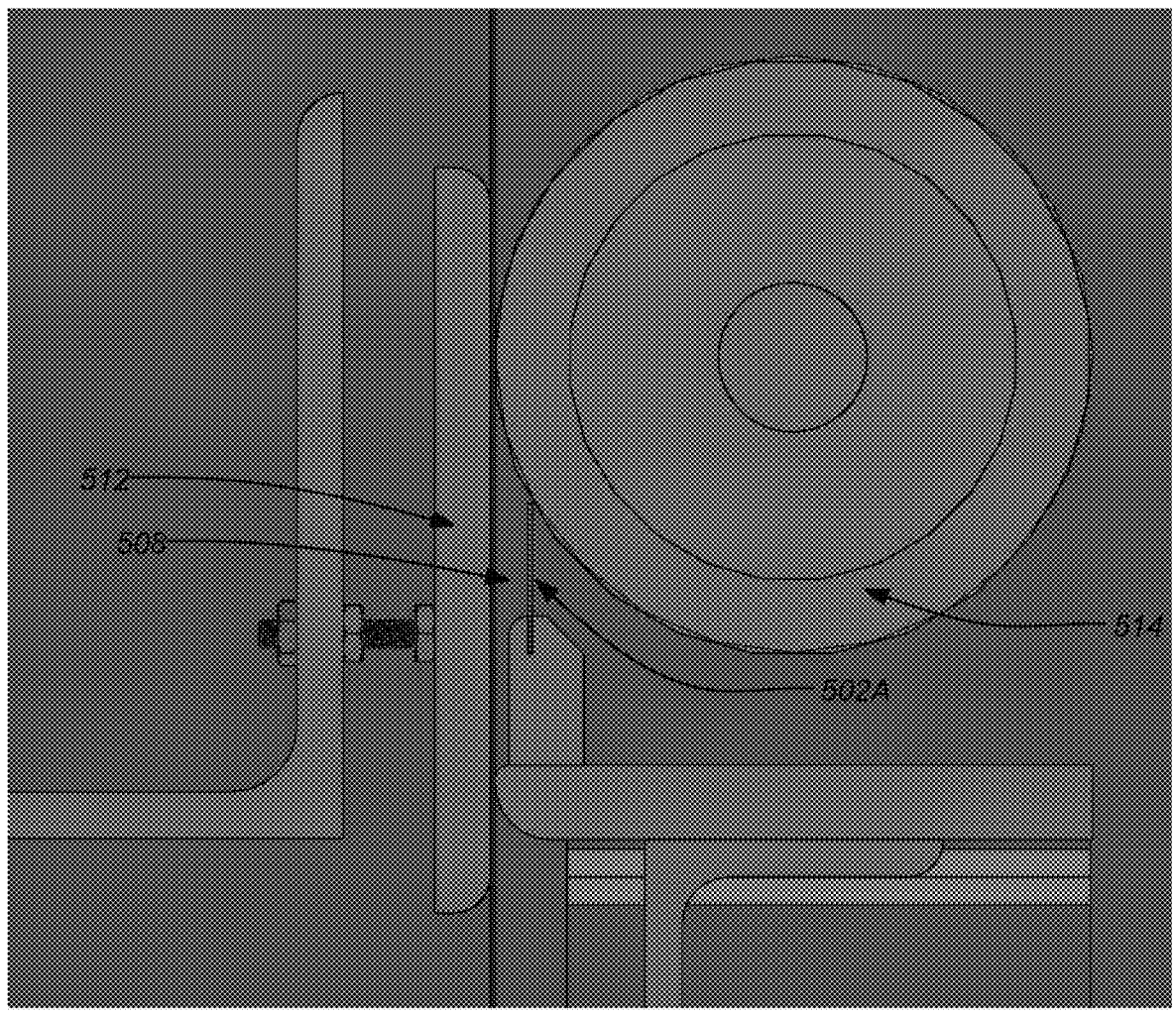
FIG. 5J is a detailed cross-sectional view of FIG. 5H showing the "shear-pump roll," the baffle, and the "pressure zone" with scraper and "exit gap."
Figure 6A:
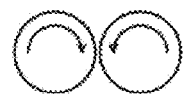
FIGS. 6A to 6H show eight possible configurations for a dip tank embodiment of the invention.
Figure 6B:
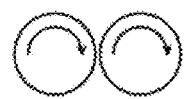
Figure 6C:
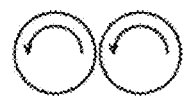
Figure 6D:
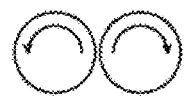
Figure 6E:
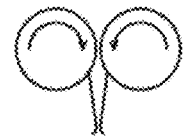
Figure 6F:
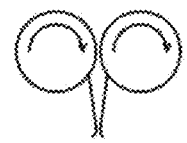
Figure 6G:
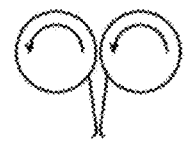
Figure 6H:
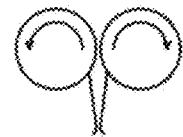

FIG. 5F shows a single "shear-pump roller" 510 driven opposite the movement of the fiber mat 504 (cloth), i.e. upward, against a baffle 512 to aid impregnation of the cloth 504. It is shown with the "shear-pump roller" rotating in the sense to push the matrix against the direction of movement of the mat 504. The mat 504 is pulled through the apparatus 500. In contrast, FIG. 5G shows the same equipment shown in FIG. 5F with the "shear-pump roller" 514 driven oppositely. FIG. 5H is the same as FIG. 5G but with the addition of a "pressure zone" 508 (second volume) formed between a single scraper 502A and baffle 512 following the "shear-pump roller" 514. FIG. 5I is an isometric view of the embodiment of FIG. 5H. and FIG. 5J is a detail view of the "pressure zone" of the embodiment of FIG. 5H.

Figure 7:
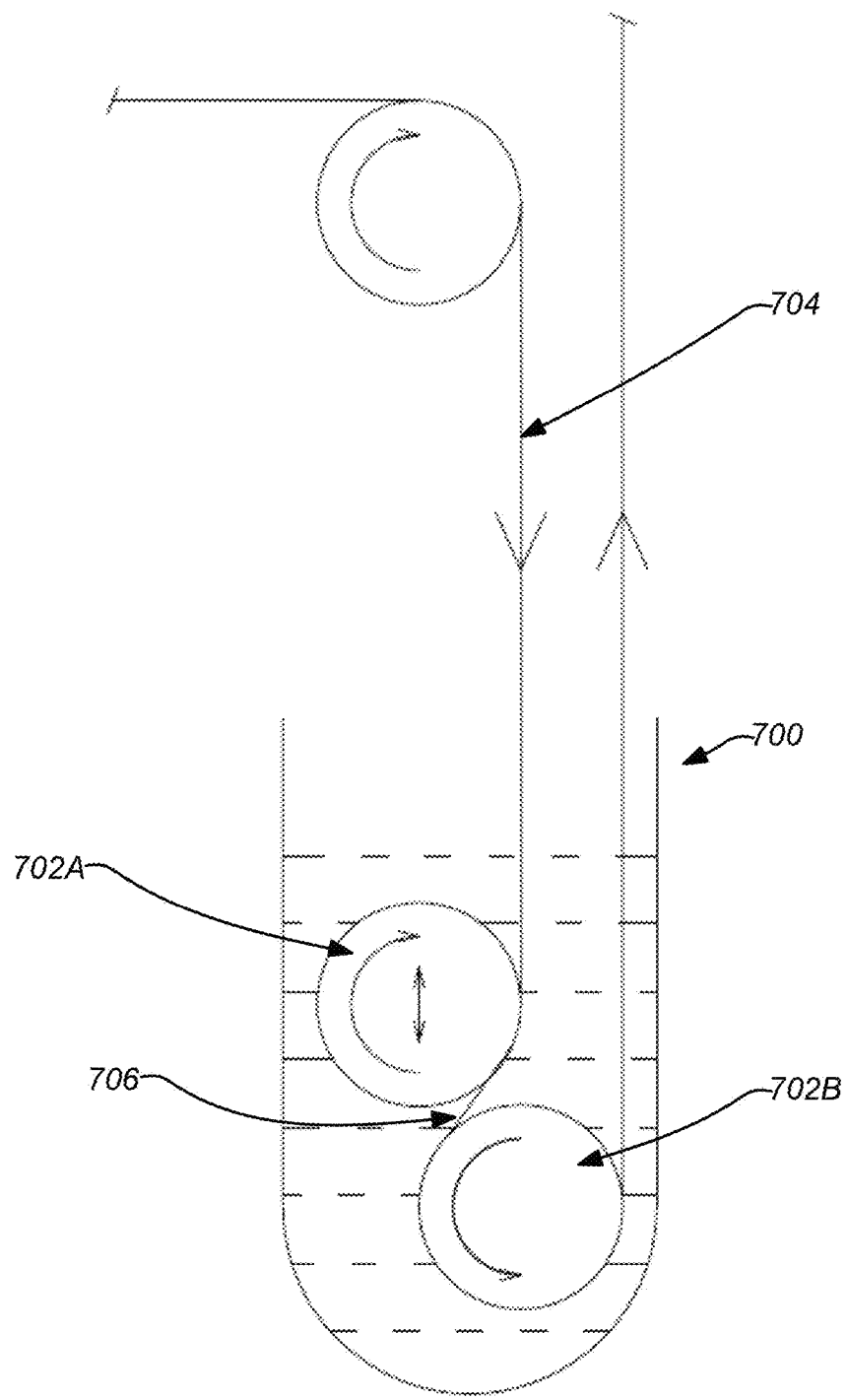
FIG. 7 shows a schematic representation of a simple low-shear impregnator with only idler rollers, no driven rollers, but with side dams and an adjustable gap to control the shear-force over a low range.

FIG. 7 shows a schematic representation of a simple low-shear impregnator 700 with only idler rollers 702A, 702B (or stationary rollers), but no driven rollers in the tank of liquid matrix, but with side dams and an adjustable gap to control the shear-force over a low range. This is a configuration for low shear forces and a low pressure barrier. Accordingly, operation is similar to the embodiments described above in FIGS. 3F and 3G but with the volume immersed in a tank of liquid matrix as will be understood by those skilled in the art. Here the liquid matrix is typically not viscous. Both rollers 702A, 702B are driven by the mat 704 (web) pulled through the tank, so they move at line speed. These are the moving surfaces, and they are moving with the mat with respect to the resin in the tank. The impregnation pressure barrier is adjusted by adjusting the gap 706 between the rollers 702A, 702B. Impregnation pressure is increased by reducing this gap 706 but can be reduced virtually to zero by increasing this gap 706 sufficiently. The gap 706 is adjustable by moving the upper roller up or down while the lower roll stays in place. Side dams on each side of the rollers assure that the liquid matrix is constrained to pass through the nip point (gap 706) or recirculate back rather than going to the sides of the rollers 702A, 702B.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A composite processing apparatus, comprising:
   an enclosed volume receiving a liquid matrix and fibers at an inlet where opposing sides of the enclosed volume form an entry gap for the liquid matrix and the fibers to enter the enclosed volume and an exit gap for the liquid matrix and the fibers to exit the enclosed volume; and
   a moving surface in contact with the liquid matrix and moving with respect to the liquid matrix such that shear forces are transferred to the liquid matrix from the moving surface pushing the liquid matrix forward toward the exit gap thus, in reaction, increasing pressure in the liquid matrix within the enclosed volume toward the exit gap;
   wherein the increased pressure within the enclosed volume, in reaction to, and roughly balanced by, the shear forces on the liquid matrix from the moving surface, forms a barrier to entrained gases which, having comparatively negligible viscosity, are not propelled forward by the same shear forces on the liquid matrix that increases its pressure, such that the entrained gases are inhibited from passing through the enclosed volume along with the liquid matrix and the fibers, and thus separated from the entrained gases, and the enclosed volume is disposed in a tank filled with the liquid matrix.

2. The apparatus of claim 1, wherein the liquid matrix comprises a viscous liquid matrix, where the viscous liquid matrix is at least an order of magnitude more viscous than water.

3. The apparatus of claim 1, wherein the fibers comprise a continuous web such as a chopped strand mat, a woven roving, and continuous parallel fibers.

4. The apparatus of claim 1, further comprising dams on each side of the enclosed volume maintaining the increasing pressure by keeping the liquid matrix moving through the enclosed volume without escaping from either side.

5. The apparatus of claim 4, wherein the moving surface comprises a surface of a driven roller immersed in the liquid matrix in the tank and disposed adjacent a second surface, and the dams on each side of the driven roller and the second surface bound the liquid matrix and the fibers are passed through the enclosed volume with the liquid matrix.

6. The apparatus of claim 5, wherein the second surface comprises a second driven roller.

7. The apparatus of claim 5, wherein the fibers are continuous and are pulled externally to the tank to contact under tension and thereby drive a pair of icier rollers such that the moving surface comprises surfaces of the pair of idler rollers, the pair of idler rollers being immersed in the liquid matrix in the tank and disposed parallel to one another forming the exit gap therebetween and having the dams on each side of the pair of idler rollers to bound the liquid matrix between the idler rollers into the exit gap.

8. The apparatus of claim 4, wherein the enclosed volume is formed with the dams between a first cylindrical surface and a second cylindrical surface.

9. The apparatus of claim 1, wherein the moving surface is a surface of a driven roller.

10. The composite processing apparatus of claim 1, wherein the fibers impregnated with the liquid matrix exit the entry gap at a line speed and the moving surface is driven to move greater than the line speed.

11. The apparatus of claim 10, further comprising dams on each side of the enclosed volume maintaining the increasing pressure by keeping the liquid matrix moving through the enclosed volume without escaping from either side.

12. The apparatus of claim 11, wherein the volume is formed with dams between a first cylindrical surface and a second cylindrical surface.

13. The apparatus of claim 10, wherein the liquid matrix comprises a viscous liquid matrix, where the viscous liquid matrix is at least an order of magnitude more viscous than water.

14. The apparatus of claim 10, wherein the fibers comprise a continuous web such as a chopped strand mat, a woven roving, and continuous parallel fibers.

15. The apparatus of claim 11, wherein the moving surface comprises a surface of a driven roller immersed in the liquid matrix in the tank and disposed adjacent a second surface and the dams on each side of the driven roller and the second surface bound the liquid matrix and the fibers are passed through the enclosed volume with the liquid matrix.

16. The apparatus of claim 15, wherein the second surface comprises a second driven roller.

17. The apparatus of claim 15, wherein the fibers are continuous and are pulled externally to the tank to contact under tension and thereby drive a pair of idler rollers such that the moving surface comprises surfaces of the pair of idler rollers, the pair of idler rollers being immersed in the liquid matrix in the tank and disposed parallel to one another forming the exit gap therebetween and having the dams on each side of the pair of idler rollers to bound the liquid matrix between the idler rollers into the exit gap.

18. The apparatus of claim 10, wherein the moving surface is a surface of a driven roller.

* * * * *